United States Patent [19]
Maxwell, III et al.

[11] Patent Number: 5,438,511
[45] Date of Patent: Aug. 1, 1995

[54] DISJUNCTIVE UNIFICATION

[75] Inventors: John T. Maxwell, III, Sunnyvale; Ronald M. Kaplan, Palo Alto, both of Calif.

[73] Assignee: Xerox Corporation, Stamford, Conn.

[21] Appl. No.: 260,205

[22] Filed: Oct. 19, 1988

[51] Int. Cl.⁶ ............................................. G06F 17/20
[52] U.S. Cl. ................................ 364/419.01; 395/10; 395/60
[58] Field of Search ............... 364/200, 900, 300, 419, 364/419.01, 419.08; 395/10, 12, 55, 66, 60

[56] References Cited

U.S. PATENT DOCUMENTS

| | | | |
|---|---|---|---|
| 4,803,642 | 2/1988 | Muranaga | 364/513 |
| 4,868,745 | 9/1989 | Pathoa et al. | 364/200 |
| 4,918,621 | 4/1990 | Nado et al. | 364/513 |
| 5,047,918 | 9/1991 | Schwartz | 364/200 |
| 5,083,268 | 1/1992 | Hemphill et al. | 395/12 |
| 5,088,048 | 2/1992 | Dixon et al. | 395/11 |

FOREIGN PATENT DOCUMENTS

| | | | |
|---|---|---|---|
| 0270360 | 6/1988 | European Pat. Off. | G06F 15/40 |
| 339901A | 11/1989 | European Pat. Off. | |

OTHER PUBLICATIONS

Shieber, "An Introduction to Unification–Based Approaches to Grammar", 1986, Published by Leland Stanford Jr. Univ., pp. 1–105.

*Discrete Mathematics in Computer Science,* Stanat et al., 1977, Prentice-Hall Inc., N.J.

Kattunen, L., "Features and Values," *Proceedings of the Tenth International Conference on Computational Linguistics,* Stanford University, Stanford, Calif., Jul. 2–7, 1984, pp. 28–33.

Kasper, R. T. and Rounds, W. C., "A Logical Semantics for Feature Structures," *Proceedings of the 24th Annual Meeting of the ACL,* Columbia University, New York, N.Y., 1986, pp. 257–266.

Kasper, R. T., "A Unification Method for Disjunctive Feature Descriptions," *Proceedings of the 25th Annual Meeting of the ACL,* Stanford University, Stanford, Calif., 1987, pp. 235–242.

Kasper, R. T., "Feature Structures: A Logical Theory with Application to Language Analysis," PhD Dissertation, University of Michigan, 1987, pp. 80–111.

Bear, J., "Feature-Value Unification with Disjunctions," SRI International, 1987.

(List continued on next page.)

*Primary Examiner*—David M. Huntley

[57] ABSTRACT

Unification of a disjunctive system is performed based on context identifiers within data structures that correspond to disjunctions. Each context identifier is a logical combination of choices, with each choice identifying one of the disjuncts of a disjunction in the system. Each choice can include a disjunction identifier and a choice identifier identifying one of the disjuncts of the identified disjunction. The logical combination of choices in a context identifier thus corresponds to a combination of disjuncts, all of which could be from different disjunctions. If two data units have context identifiers identifying contexts that are genuine alternatives, those data units are not unified. Data units that have context identifiers that are not genuine alternatives are unified. A set of context-value pairs, referred to as a disjunctive value, can be unified with another disjunctive value by considering all combinations of pairs of context identifiers that include one context identifier from each disjunctive value. The number of combinations of context identifiers in each disjunctive value is reduced by combining context-value pairs: Pairs with equal value tokens are combined by merging their context identifiers and unifying the value tokens. Pairs with f-structures as values are combined by merging context identifiers and unifying the f-structures. If it is necessary to insert a pointer, the pointer is inserted so that it initially leads to a disjunctive value, with the source of the pointer indicating which of the context-value pairs in the disjunctive value is to be accessed.

51 Claims, 16 Drawing Sheets

OTHER PUBLICATIONS

Kaplan, R. M. and Bresnan, J., "Lexical-Functional Grammar: A Formal System for Grammatical Representation," in Bresnan, J., (Ed.), *The Mental Representation of Grammatical Relations*, MIT Press, Cambridge, Mass., 1982, pp. 173-281.

De Kleer, J., "Extending the ATMS," *Artifical Intelligence*, vol. 28, (1986), pp. 163-196.

jMackworth, A., "Constraint Satisfaction," in Shapiro, S. C. and Eckroth, D., eds., *Encyclopedia of Artifical Intelligence*, New York: Wiley, 1987, pp. 205-211.

Eisele, A. and Dörre, J., "Unification of Disjunctive Feature Description," *Proceedings of the 26th Annual Meeting of the ACL*, Buffalo, N.Y., 1988, pp. 286-2945.

Johnson, M., "Determining Satisfiability of Quantifier-Free Formulae without Expansion to DNF," unpublished manuscript of Jun. 6, 1988.

European Search Report for Application No. EP 89 31 0723.

Vadera, S. "A theory of unification" *Software Engineering Journal*, vol. 3, No. 5, Sep. 1988, pp. 149-160.

Conery, J. S. and Kibler, D. F., "Parallel Interpretation of Logic Programs," ACM Proceedings of 1981 Conference on Functional Programming Languages and Computer Architecture, Oct. 1981, New York, pp. 163-170.

Hillis, W. D. and Steele, Jr., G. L., "Data Parallel Algorithms," Communications of the ACM, vol. 29, No. 12, Dec. 1986, pp. 1170-1183.

Ke, G. Y., Li, D. X., Guo, F. J., Xing, W. D., and Min, Z. W., "Design Considerations of a Distributed Parallel Reduction Architecture," IEEE Second International Conference on Computers and Applications, Jun. 1987, Peking, China, pp. 809-816.

DISJUNCTIVE UNIFICATION

BACKGROUND OF THE INVENTION

The present invention relates to techniques for solving a disjunctive system. More specifically, the invention relates to techniques that make it feasible to handle disjunctions within unification.

A number of general approaches have been proposed for solving a system such as a logical formula whose terms are equations. Some of these, such as term rewriting, operate directly on the terms, which are typically conjoined equations. Others, such as unification or merging, operate on terms converted into suitable data structures. Approaches of either of these types typically perform poorly if the system being solved includes disjunctions.

One conventional technique for handling disjunctions is to expand a system into disjunctive normal form and then solve each disjunct separately using unification. If any of the disjuncts has a consistent solution, the system is consistent and its solutions are the combined solutions of the consistent disjuncts. If none of the disjuncts has a consistent solution, the system is inconsistent and has no solutions. This technique performs poorly for a system with a large number of disjunctions, however, because the number of disjuncts in a system's disjunctive normal form increases exponentially with the number of disjunctions in the system.

Karttunen, L., "Features and Values," *Proceedings of the Tenth International Conference on Computational Linguistics*, Stanford University, Stanford, Calif., Jul. 2–7, 1984, pp. 28–33, discusses linguistic aspects of a general purpose facility for computing with features, where a feature may be thought of as an attribute-value pair. Pages 30–32 describe a modified unification procedure that admits disjunctive values, indicated by enclosing alternative values in braces "{}". In unifying, the disjunctive value is treated differently than an ordinary non-disjunctive value. In unifying a disjunctive value whose disjuncts are simple atomic values with a non-disjunctive simple atomic value, the result is the non-disjunctive value only if it is identical with one or the other of the disjuncts in the disjunctive value. If the disjuncts and the non-disjunctive value are all complex, on the other hand, the result is a complex disjunction indicating that either one or the other of the disjuncts is to be unified with the non-disjunctive value. Appendix A includes several further examples, of which the examples unifying "die" and "den" with "Kinder" and unifying x, y, and z illustrate unification of complex disjunctions. As shown for "(Unify x y)", a disjunct can be fully expressed in one of its occurrences, appearing in another occurrence as a pointer to the full expression.

Kasper, R. T. and Rounds, W. C., "A Logical Semantics for Feature Structures," *Proceedings of the 24th Annual Meeting of the ACL*, Columbia University, New York, N.Y., 1986, pp. 257–266, describe a model for unification of a feature structure such as an attribute composed of a label/value pair. Section 2 describes a complication that arises in applying Karttunen's disjunctive values if one of the alternatives of a disjunction contains a value specified by a non-local path; constraints on alternatives of a disjunction must also apply to any non-local values contained within those alternatives. Section 4.2 defines a domain of logical formulas that describe feature structures and section 5.1 shows that the consistency problem for formulas in that domain is NP-complete if the domain includes disjunction. Therefore, any unification algorithm for formulas in that domain will almost certainly have non-polynomial worst-case complexity. Section 5.2 describes the disjunctive normal form, and points out that finding the normal form of a formula requires exponential time, where the exponent depends on the number of disjunctions in the formula. Section 5.3 describes a technique of reducing the number of disjunctions in a formula before expanding to disjunctive normal form: unifying two descriptions frequently reduces the number of terms by eliminating inconsistent terms. Section 5.4 and FIGS. 5"7 illustrate how a non-local value may be expanded to an equivalent class of paths for unification. Section 5.5 indicates that formulas containing value disjunction can be transformed into formulas containing general disjunction, but not vice versa.

Kasper, R. T., "A Unification Method for Disjunctive Feature Descriptions," *Proceedings of the 25th Annual Meeting of the ACL*, Stanford University, Stanford, California, 1987, pp. 235–242, based on Kasper, R. T., *Feature Structures: A logical Theory with Application to Language Analysis*, PhD dissertation, University of Michigan, 1987, pp. 80–111, describes a method of unification by successive approximation that applies to descriptions containing general disjunction and non-local path expressions. Section 2 defines a data structure for disjunctive descriptions, a feature-description that includes a definite component and an indefinite component that is a set of disjunctions. Section 3 and FIGS. 3–6 describe the algorithm for unifying two such feature-descriptions, first by unifying their definite components, and then by examining the compatibility of their indefinite components, first checking compatibility with the unified definite components and then checking the compatibility of groups of disjuncts of different disjunctions, if any disjunctions remain. This final compatibility check is the most inefficient step, and can be used only at strategic points during a parse.

Bear, J., "Feature-Value Unification with Disjunctions," *SRI International*, 1987, describes a program for doing feature-value unification with directed acyclic graphs containing disjunctions, based on Karttunen's technique. Section 4 discusses the need to allow for disjunctions within disjunctions. Section 5 discusses a kind of circularity that can arise in directed acyclic graphs (dags). Section 6 discusses techniques for deciding whether a dag is consistent.

Kaplan, R. M. and Bresnan, J., "Lexical-Functional Grammar: A Formal System for Grammatical Representation," in Bresnan, J., (Ed.), *The Mental Representation of Grammatical Relations*, MIT Press, Cambridge, Mass., 1982, pp. 173–281 ("the LFG article"), presents a formalism for representing syntactic knowledge that is called lexical-functional grammar ("LFG"). Section 4.1 describes a sentence's functional structure ("f-structure") as encoding the sentence's meaningful grammatical relations as a set or hierarchy of ordered pairs each of which consists of an attribute and a specification of that attribute's value for the sentence. Section 4.2 sets forth the axiom that a particular attribute may have at most one value in a given f-structure. Sections 4.3 and 4.4 describe how an f-structure may be obtained from a constituent structure ("c-structure") that indicates the arrangement of words and phrases in a sentence. Section 4.4 and the Appendix describe the Locate and Merge operators, used in processing an equation derived from a functional description ("f-description") that is in turn derived from a c-structure. The Locate operator is applied to each of the sides, or designators, of an equation in the f-description to obtain the respective value of each designator. When the values have been located, the Merge operator determines whether the values are the same, hence satisfying the equality; if not, the Merge operator constructs a new entity by combining the properties of the values, provided their properties are compatible. This entity becomes the common value of the two designators. If two entities to be merged are incompatible, the Merge operator so indicates, and Section 4.5 discusses inconsistency, one type of incompatibility. The f-structures (50) and (108) illustrate representations of cooccurrences of a placeholder within an f-structure. Section 4.7 discusses long-distance dependency, with f-structures (131), (133), (143), and (169) illustrating control linkages.

De Kleer, J., Extending the ATMS," *Artificial Intelligence*, Vol. 28, (1986), pp. 163–196, describes an extension of the assumption-based truth maintenance system (ATMS) to handle disjunctions of assumptions. Page 163 defines environment" as a set of assumptions and defines "context" of an environment as the set of all data propositionally derivable from the assumptions using inferences, called justifications." Pages 170–173 describe disjunctions of assumptions, introducing rules to ensure label consistency and completeness. Pages 184–185 describe complex justifications, such as one of disjunctions. Pages 193–195 describe implementing disjunction, in which disjunctions are stored in a separate database. A false assumption can be removed from all disjunctions.

Mackworth, A., "Constraint Satisfaction," in Shapiro, S. C. and Eckroth, D., eds., *Encyclopedia of Artificial Intelligence*, New York: Wiley, 1987, pp. 205–211, describes backtracking and consistency algorithms for constraint satisfaction problems at pages 207–209.

SUMMARY OF THE INVENTION

The present invention provides more efficient techniques for solving disjunctive systems. Furthermore, the invention provides techniques that permit disjunction to be handled completely within unification.

One aspect of the invention is based on the recognition of a basic problem in handling disjunction completely within unification. Conventional techniques have difficulty handling interactions between disjunctions because they do not preserve information about such interactions in a form consistent with effective unification. Unification operates on data structures, unifying the data structures into a single data structure with which all of them are consistent, if possible. In unifying two data structures, a data unit of one data structure is unified with a data unit of the other, which may result in a new data unit combining the two unified data units. In case of disjunction, the unification algorithm must preserve the information necessary to consider possible combinations of disjuncts in order to be effective.

This aspect of the invention is further based on the discovery of a technique for preserving information about combinations of disjuncts within data structures being unified. The technique uses context identifiers each of which identifies a combination of disjuncts, each from a different disjunction than any of the others. Each disjunct in the combination can be identified with a unique identifier. The disjunct and its disjunction could each be identified with a unique number, for example, the two numbers together forming a choice that can be combined with other choices to form a context identifier. A data unit within a data structure being unified can have an associated context identifier indicating the combination of disjuncts to which that data unit corresponds.

When a data unit is accessed during unification, the associated context identifier can be retrieved and used in unification to determine whether that data unit must be unified with another data unit. For example, if each context identifier is a logical combination of choices, each including a disjunction identifier and a choice identifier as described above, the context identifiers of data units corresponding to disjuncts from the same disjunction each include a choice with that disjunction's identifier; the context identifiers of data units corresponding to the same disjunct further include the same choice identifier. Unless their context identifiers indicate that two data units correspond to two different disjuncts of one of the disjunctions, those data units must be unified.

In unifying data units, the result can therefore depend on a comparison of their context identifiers. If their context identifiers indicate that the two data units correspond to different disjuncts of a single disjunction, they are treated as mutually exclusive and are not unified. If their context identifiers indicate that they correspond to disjuncts of different disjunctions or that they correspond to the same disjunct, they may or may not be consistent, depending on the feature values in the data units.

A closely related aspect of the invention is based on the recognition of a problem in associating context identifiers within a hierarchical data structure. In general, the unification of different context identifiers results in an expansion or cross product multiplication to consider all possible combinations of contexts, similar to expanding to the disjunctive normal form. Therefore, context identifiers that are relatively high in hierarchical data structures being unified result in an inefficient expansion between the context identifiers in the data structures.

This aspect of the invention solves this problem based on the recognition that the number of context identifiers that are relatively high in a hierarchical data structure can be reduced by combining context identifiers. Context identifiers can only be combined, however, if data units that depend from them can be combined. Therefore, this solution depends on including context identifiers in data structures such that the data units that depend from them can frequently be combined, either by unification or other techniques.

This solution can be implemented by including each context identifier in a data unit that includes only that context identifier and a corresponding value. In other words, each context identifier occurs in a data unit that is a context-value pair. This makes it possible to form a disjunctive value data unit that includes a set of such data units. A disjunctive value data unit can then be associated with a feature token, to form a feature-value pair in which the value is a disjunctive value. And the number of context identifiers in a disjunctive value data unit can be reduced by combining context-value pairs.

This aspect of the invention is further based on the discovery that context-value pairs can be combined in at least two instances-if both pairs have as their values the same atomic value and if both pairs have as their values sets of feature-value pairs, also referred to herein as f-structures. If two pairs have the same value and the value is a token corresponding to an atomic value, the pairs can be combined by merging their context identifiers into a single context identifier that covers the contexts identified by the context identifiers in both pairs. And if the values of two context-value pairs are both f-structures, the contexts can be similarly merged and the f-structures can be unified to combine the context-value pairs.

This aspect is further based on the recognition that if the values of all of the context-value pairs in a set of alternatives are f-structures, the result of merging the contexts and unifying the f-structures is to move the context identifiers downward in the data structure, below the feature tokens. This is especially efficient because unification of different feature tokens, unlike unification of context identifiers, results in a simple concatenation or addition of the features and their values because different features do not interact. Therefore, when feature tokens are higher in the hierarchy than context identifiers, the feature tokens are indexed before the context identifiers, resulting in simple concatenation of different features and their values. Only if the same feature occurs in two f-structures being unified is it necessary to consider the feature's values and any context identifiers the values contain. In this case, expansion may occur, but not to the same extent as if the context identifiers were above the feature tokens in the data structures.

Another closely related aspect of the invention is based on the recognition of a problem resulting from the expansion that inevitably occurs during unification of complex data structures that include context identifiers as described above. This expansion involves evaluation of possible combinations of disjuncts, or contexts, with each context including one disjunct from each of a set of disjunctions. In general, the computational resources required for such an evaluation increase exponentially as the number of disjunctions increases, because all of the contexts must be considered to discover all of the inconsistent contexts; a context can be treated as inconsistent if, for any feature, inconsistent values are assigned to that feature in that context. The resources required increase even more rapidly as the number of disjuncts in each disjunction increases.

This aspect is further based on the recognition that the expansion of contexts can be made more tractable by using a propositional reasoner such as an assumption-based truth maintenance system (ATMS). A propositional reasoner can determine more efficiently which contexts are inconsistent and which are consistent. Furthermore, upon discovering an inconsistent context, the unification procedure can treat all instances of that context as inconsistent, thus further reducing the computational resources required.

Another aspect of the invention is based on the recognition of a set of problems that arise due to certain types of equations that may be included in a disjunctive system. For example, two features may be equated or a feature may be equated with a variable that occurs in more than one equation. In a disjunctive system, one of these equations can occur in a disjunct, in which case the proper computations are unclear. If an equation equating two features is interpreted as requiring unification of those features, unexpected inconsistencies may occur in contexts other than the disjunct in which the equation holds. Similarly, if the equation is interpreted as meaning that the values of the equated features are the same in that context, it is conventional to include the complete value at only one of its occurrences, the other occurrence containing a pointer that leads to the complete value; a subsequent expansion can produce several contexts that include the complete value, leaving it unclear where the pointer should lead.

These problems can be solved through further refinements of the techniques described above. One refinement relates to the manner in which unification is performed. The other relates to the manner in which pointers are included in data structures.

The first refinement, relating to unification, is based on the recognition that context identifiers can be used to confine the effects of unification resulting from an equation within a disjunct. The equated entities should not be unified throughout a disjunctive system, but only in the context that applies to the disjunct in which the equation holds. In other words, in unifying the equated entities, only subentities that depend from context identifiers that are compatible with that context are subject to being unified. Other subentities should not be unified, because they cannot occur in the context in which the equation occurs. This technique is referred to herein as "unification in a context" to distinguish it from unification in all contexts.

One result of unifying in a context is that a broader context may be split into a context-value pair that occurs in the unification context and another that occurs in other contexts. If their values are f-structures, these context-value pairs can then be combined as described above for more efficient unification, but the process of splitting and then combining context-value pairs is relatively inefficient. This problem can be solved by initially adding a feature-value pair to one of the f-structures with a feature that has a value only in the other f-structure and with a disjunctive value explicitly indicating that the feature, prior to unification, does not have a value in the context applicable to that feature-value pair. The two f-structures can then be unified, resulting in an f-structure in which that feature has an appropriate disjunctive value and avoiding the inefficient process of splitting and then combining context-value pairs.

The second refinement, relating to pointer inclusion, is based on the recognition that the context of the destination of a pointer can be determined from the origin of the pointer, so that it is not necessary for the pointer to lead directly to its destination. If, whenever a pointer is included in a data structure, it leads to a disjunctive value rather than to any of the alternatives within the disjunctive value, the context from the origin of the pointer can be used to identify the alternative that is the destination of the pointer. If this technique is followed, an equation between two features that occurs only in a given context will be represented by a pointer originating at the location of one feature's value in that context and leading, not to the location of the other's value in that context, but to a position in the data structure above the value of the other feature that includes that context, which may be a disjunctive value or may be an f-structure resulting from combining context-value pairs within a disjunctive value. More generally, a pointer that is followed to reach a data unit that occurs as a value in a context-value pair does not lead directly to the data unit, but instead to a position above the context-value pair that includes it. The context, which is known from the origin of the pointer, can be used to identify the corresponding context-value pair within a disjunctive value, when necessary. Meanwhile, if an expansion occurs within the disjunctive value, it will not affect the pointer, which continues to point to the disjunctive value itself or to a position above it in the data structure.

The following description, the drawings and the claims further set forth these and other objects, features and advantages of the invention.

DETAILED DESCRIPTION

A. General Features

Figure 1:
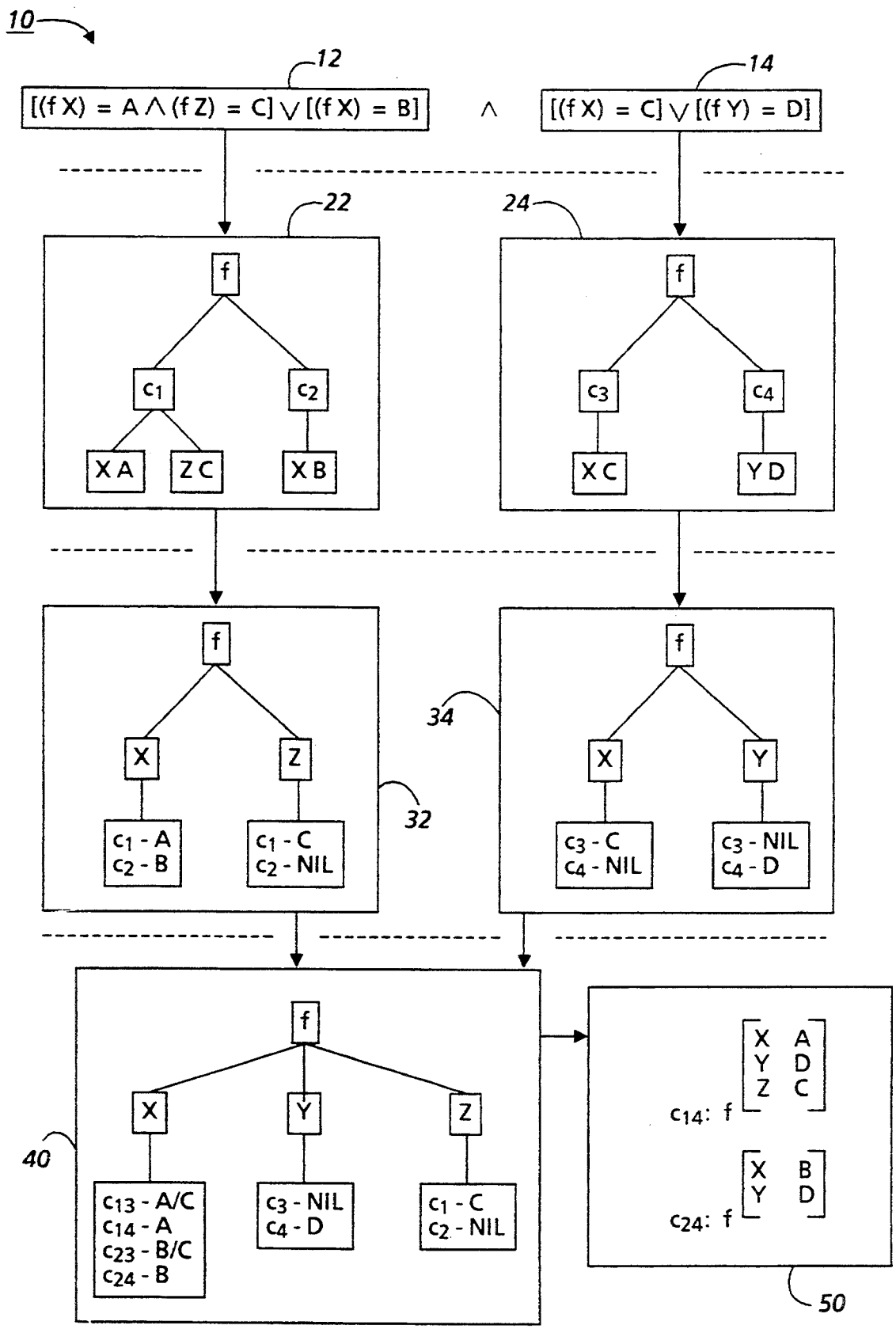
FIG. 1 is a schematic flow diagram showing general steps in creation and unification of two data structures that include context identifiers according to the invention.

The following conceptual framework is useful in understanding the broad scope of the invention. The terms defined below have the meanings indicated throughout the specification and in the claims.

A "data structure" is any combination of interrelated data.

A "data unit" is a data structure that is accessible as a unit by a data processing system. A data unit is "included" in another data structure by making it accessible based on the location or contents of other data in that other data structure. Two data units are "associated" with each other whenever either of them is accessible based on the location or contents of the other. For example, two data units may be associated with each other by including one within the other, by including both in a third data unit, or by including a third data unit in both. Also, two data units can be associated by including an item of data in one that can be used to access the other, such as a pointer or handle. Similarly, two data units can be associated by associating both with a third data unit such as a table entry or other data structure that includes a pointer to each of them. Or two data structures can be associated by positioning them in adjacent locations or in locations with a known separation.

A "context" is one of a set of alternatives. If the alternatives are genuine alternatives, being both mutually disjoint or exclusive and also members of a set that is complete or closed, the context is a "genuine alternative context." In other words, one and only one of a set of genuine alternative contexts holds.

A "context identifier" is data that uniquely identifies a context. A context identifier can, for example, be a combination of bits, a number or other character, or a name identifying the corresponding context. A context identifier could also be a logical combination of context identifiers, such as a negation, conjunction, or disjunction. In this case, the primitive or simplest context identifiers from which other context identifiers can be constructed are called "choices."

A "logical system" is a logical formula whose terms are equations relating logical elements. A "disjunctive system" is a logical system that includes one or more disjunctions between its terms. A "disjunct" is an alternative of a disjunction within a disjunctive system. A disjunct is therefore an example of a context. A logical combination of disjuncts is also an example of a context.

A data unit within a data structure "corresponds" to a disjunct if, when a disjunctive system that includes the disjunct is mapped onto the data structure, the disjunct is mapped onto the data unit. More generally, a data structure "corresponds" to a logical system if the logical system can be mapped onto the data structure. An operation on a data structure "corresponds" to an operation on a logical system if the data structure can be mapped onto the logical system both before and after the operations are performed. Frequently it is more efficient to perform an operation on a data structure than it would be to perform the corresponding operation on its corresponding logical system.

The terms "feature" and "value" have interdependent meanings: A feature is always a symbol or atomic element, and a feature can take a value. A "feature-value pair" is a feature and one of the values it can take.

The value of a feature could itself be a symbol or atomic element or it could be a set of feature-value pairs. A value or a feature-value pair can be included in a disjunct in various ways; for example, the disjunct could be an equation that includes them or could be a conjunction of equations, one of which includes them.

A "token" is data that uniquely corresponds to a logical element, such as a feature or a value. A token could, for example, be a combination of bits, a number or other character, or a name corresponding to the feature, value, or other logical element to which it corresponds.

A context identifier or a token can be "included" in a data structure as defined above for a data unit, except that a context identifier or a token need not be a separate data unit, so that it can also be included by being encoded into a data unit that is included in the data structure. A context identifier or a token can similarly be "associated" as defined above for a data unit, except that it can also be associated with a data unit by being encoded into the data unit and can be associated with another identifier or token by being encoded together into the same data unit or into separate data units that are themselves associated.

"Unification" or "unifying" is an operation on two data structures that produces a unified data structure with which both are consistent. In general, the unified data structure includes more information than the data structures that it unifies. If the two data structures are inconsistent, the unified data structure indicates inconsistency. In unifying two data structures, each of which includes a respective data unit, it may therefore be necessary to unify the respective data units into a unified data unit. As used herein, unification thus includes attribute-value or feature-value unification, as used in the lexical-functional grammar (LFG); place-value or term unification, as used in Prolog, which yields a set of value assignments known as the most general unifier; graph unification or congruence closure; computation of deductive closure or term rewriting; and other such operations on any appropriate data structures. The data structures on which unification can be performed include, for example, the attribute-value forms of hierarchical tabular functions and the place-value forms of databases such as knowledge bases.

A "pointer" is data that indicates a location within a data structure. A pointer can be a memory address, an "offset" or a handle, for example. A pointer "leads to" the location that it indicates. A pointer can also be at a location within the data structure.

A "disjunctive value data unit" is a data unit that includes a set of data subunits that together provide a set of alternatives. Each data subunit may, for example, include one of a set of context identifiers. The context identifiers of a disjunctive value data unit could identify a set of genuine alternative contexts or they could identify overlapping contexts. A pointer "leads to" a disjunctive value data unit when it indicates a location from which the disjunctive value data unit can be accessed but does not indicate the location of any of the alternatives.

Figure 2:
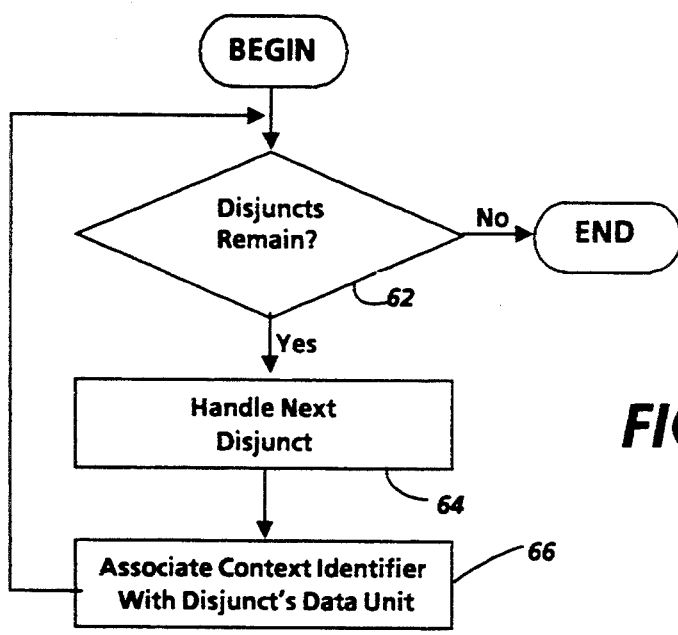
FIG. 2 is a flow chart showing general steps in producing a data structure that includes context identifiers according to the invention.
Figure 3:
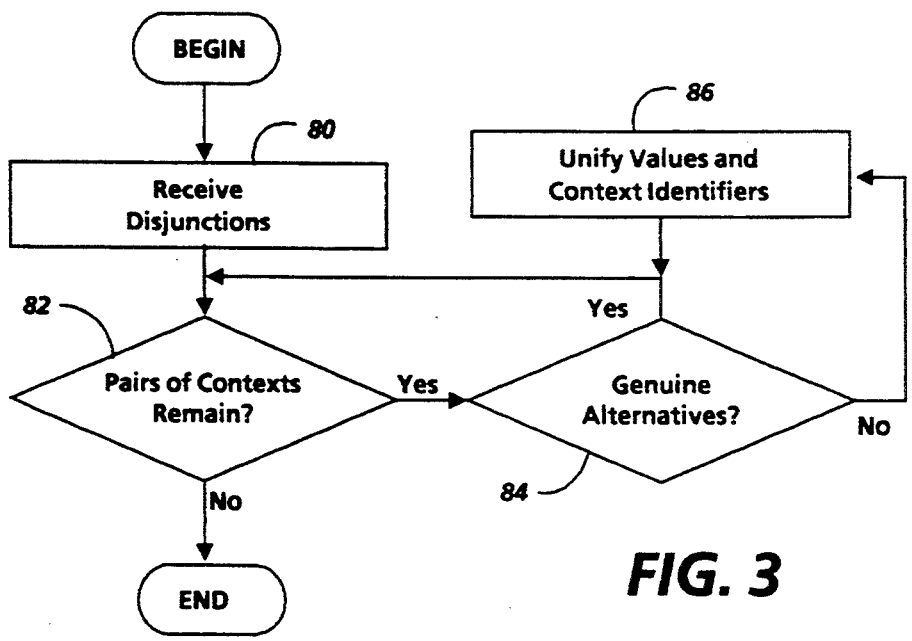
FIG. 3 is a flow chart showing general steps in unifying data structures that include context identifiers according to the invention.

Based on this conceptual background, general features of the invention can be understood from FIGS. 1-3. FIG. 1 illustrates graphically the creation and unification of two feature-value data structures that include context identifiers. FIG. 2 shows steps in creating such data structures. FIG. 3 shows general steps in unifying feature-value data structures that include context identifiers.

FIG. 1 shows a sequence of general steps, beginning with disjunctive system 10 that includes disjunctions 12 and 14, each illustratively including a number of feature-value equations although the invention is also applicable to other types of disjunctions, as described above. Each disjunction is converted to a data structure, and these data structures are then unified to obtain a solution of the disjunctive system.

In LFG, attribute-value or feature-value structures are treated as mathematical functions, with the attributes or features treated as the functions' arguments. This is because the unique-value property of functions corresponds directly to the fact that an attribute in an attribute-value structure or a feature in a feature-value structure can have at most one value. We use the function/argument terminology freely in the following discussion.

Disjunction 12 includes three feature-value equations—(fX)=A; (fZ)=C; and (fX)=B—while disjunction 14 includes two feature-value equations—(fX)=C and (fY)=D. Each of these simple feature-value equations includes three symbols: the first symbol is a function variable token corresponding to a function, in this case the function represented by the variable "f" for all equations; the second symbol is a feature token corresponding to a feature of the function, in this case feature "X", feature "Y", or feature "Z"; and the third symbol is a value token corresponding to a value the feature of the function can take, in this case "A", "B", "C", or "D". In general, a function is a set of feature-value pairs in which each feature occurs at most once. Variables are often used to represent functions in a logical system, and can also be used to represent other entities in the system. A solution of a logical system is a list of variable-value pairs or assignments that are consistent with the system.

In disjunction 12, the first and second equations are separated by the connector ∧, indicating that they are conjoined, while the second and third equations are separated by the connector ∨, indicating that the conjunct of the first and second equations is disjoined with the third equation. Similarly, the two equations in disjunction 14 are disjoined. Between disjunctions 12 and 14 is the connector ∧, indicating that the two disjunctions are themselves conjoined, so that data structures corresponding to disjunctions 12 and 14 could be unified to obtain the solutions of disjunctive system 10, if any. In FIG. 1, the connector ∨ represents weak or inclusive disjunction and is ultimately interpreted accordingly; for computational purposes, however, the ∨ connector is treated as strong or exclusive disjunction through the use of context identifiers, in order to obtain the least redundant structures as solutions.

The conversion of each disjunction into a data structure for unification could be done in various ways. For example, data structures 22 and 24 are hierarchical data structures that include substantially all the information in disjunctions 12 and 14, respectively. In other words, it is possible in general to map disjunction 12 onto data structure 22 and disjunction 14 onto data structure 24, and vice versa. Since all the equations in each disjunction have the same function, represented by the function variable token "f", the uppermost hierarchical level that is required in each data structure is that of the function; a higher root level could be provided if there were more than one function token. The next lower hierarchical level in each data structure includes a context identifier identifying each disjunct, in accordance with the invention. The disjuncts of disjunction 12 are identified as "$c_1$" and "$c_2$", while those of disjunction 14 are identified as "$c_3$" and "$c_4$". These context identifiers correspond to genuine alternative contexts. As discussed above and as illustrated below, these context identifiers make it possible to preserve information about combinations of disjuncts within data structures being unified. Finally, the lowest level of each data structure includes feature-value pairs, each feature-value pair including a feature token and a value token. The feature-value pairs within each disjunct depend from that disjunct's context identifier.

As discussed above, unifying data structures 22 and 24 would be inefficient, because the context identifiers are relatively high in the hierarchy of each data structure, which would result in expansion to consider all possible combinations of context identifiers. Therefore, in accordance with a further aspect of the invention, alternative context-value pairs in data structures 22 and 24 are combined to produce data structures 32 and 34, in which each feature that previously occurred in a feature-value pair now has a disjunctive value data unit that includes appropriate context identifiers, so that the feature tokens are now above the context identifiers in the hierarchy.

At this point, data structures 32 and 34 can be unified to obtain unified data structure 40. As can be seen, the upper level of data structure 40 is the same as that of data structures 32 and 34, because the data structures have the same function token. The middle level is different because it includes a feature token for each of the three features, rather than just for two features as in data structures 32 and 34. The disjunctive value data units for feature X have been unified by merging the context identifiers and unifying the value tokens. The disjunctive value data units for features Y and Z, on the other hand need not be unified but rather can be concatenated, because each occurs in only one of data structures 32 and 34; this is advantageous, because it avoids unnecessary computation and additional memory consumption.

In unifying the disjunctive value data units for feature X, each pair of context identifiers, one from each data unit, has been unified into a context identifier. For example, "$c_1$" and "$c_3$" have been unified into "$c_{13}$". In this case, this corresponds to taking the cross product or considering all possible combinations of the context identifiers from the two data structures, because the context identifiers in each data structure provide an independent set of alternatives. The value token associated with each of these unified context identifiers has been obtained by unifying the value tokens from the two unified contexts following relatively simple rules. If one value token was NIL, the result of unification is the other value token. If both value tokens are non-NIL and they differ from each other, then the result is an inconsistency, indicated by showing both value tokens separated by a slash, such as "A/C".

Finally, unified data structure 40 can be used to obtain solutions of disjunctive system 10. If a context is inconsistent, it is inconsistent everywhere, so that all of the contexts except "$c_{14}$" and "$c_{24}$" are inconsistent in the illustrated example. Therefore, tabular functions 50 are the two solutions of disjunctive system 10 corresponding to the two contexts "$c_{14}$" and "$c_{24}$". Within each context's tabular function, each feature that has a specified value in that context is paired with its value.

FIG. 2 shows general steps that could occur in creating data structures 22 and 24 when each disjunction is encountered within disjunctive system 10. An iterative loop beginning with the test in box 62 goes through each of the disjuncts in turn, handling the next disjunct in box 64, to obtain a data unit corresponding to that disjunct. The step in box 64 may include a recursive operation if the disjunct is in turn a disjunction. When the data unit is obtained, the step in box 66 associates a context identifier with the data unit. For example, this could be done as in data structures 22 and 24 in FIG. 1, with each disjunct's data unit including the context identifier and feature-value pairs linked to the context identifier. When all the disjuncts of a disjunction have been handled, the iterative loop ends.

FIG. 3 shows general steps that could be followed in unifying disjunctions, such as those in data structures 32 and 34. The step in box 80 receives the disjunctions to be unified. The iterative loop beginning with the test in box 82 goes through each pair of context identifiers, one taken from each disjunction, handling each pair in turn. If the test in box 84 determines that the pair are genuine alternatives, they are not unified. Otherwise, the context identifiers and associated values are unified as described above, in box 86. When all the pairs have been considered in this manner, the disjunctions have been unified and the steps in FIG. 3 end.

Based on these general features, we turn now to consider a specific implementation of the invention.

B. Disjunctive Unification of LFG Feature Descriptions

Feature descriptions provide an example of how the invention can be applied. Feature descriptions are commonly used in such fields as natural language processing, data base queries, and constraint reasoning systems. A feature description gives a partial description of something, and can be conjoined with other such descriptions to form a fuller description. Each feature description can be thought of as a constraint on the solutions of a logical system such as a system of equations.

The following example applies the invention to feature descriptions expressed in the notation of the lexical-functional grammar (LFG) formalism, described in more detail in the LFG article. The techniques described below for use with LFG feature descriptions can be easily generalized to other notations and to other formalisms, and can even be generalized to non-feature description systems based on other forms of unification, such as the term unification used in PROLOG.

The LFG formalism represents a primitive feature description as a function application, in the general form (fa)=v, where f is a function, a is a feature (called an "attribute" in LFG), and v is the feature's value. LFG is used for natural language processing, and a typical LFG equation would be $(f_1 NUM) = SG$, in which the variable $f_1$ is a function with the feature NUM, and NUM's value is SG. This equation could state that a noun's number is singular. Similarly, in $(f_2 SUBJ) = f_1$, $f_2$ is a function with the feature SUBJ whose value is the function $f_1$; in $(f_3\ NUM) = (f_3\ SUBJ\ NUM)$, the NUM feature of function $f_3$ is the same as the NUM feature of its SUBJ, which could state subject-verb agreement.

A system of feature descriptions is said to be inconsistent if there is no assignment of values to all the features that satisfies all the descriptions in the system. For instance, $(f_1 \text{NUM}) = \text{SG}$ and $(f_1 \text{NUM}) = \text{PL}$ are inconsistent because no single value can be assigned to $f_1$'s NUM feature that would satisfy both descriptions.

A system of feature descriptions is therefore evaluated by (1) determining if the system is consistent and (2) if it is, enumerating the consistent assignments of values to features. These steps can be performed through equality substitutions that manipulate the equations directly. They can also be done by unifying data structures equivalent to the equations. As noted above, the invention provides data structures that can be efficiently unified even though they include disjunctions. The data structures include context identifiers, and features within the data structures have disjunctive values.

Appendices A, B, and C are Medley Lisp code suitable for execution on a Xerox 1186 workstation, available through Envos Corporation, 1157 San Antonio Road, Mountain View, California 94043. Appendix A, called the Simple Disjunction file, includes the top level functions of disjunctive unification that produce data structures from a system of feature descriptions and then unify the data structures in accordance with the invention; the main function in the Simple Disjunction file is SOLVE, through which the other functions are called. Appendix B, called the LFG Contexts file, includes a number of intermediate level functions that are called by functions in the Simple Disjunction file and that together serve as a propositional reasoner analogous to the ATMS, determining which combinations of disjuncts are consistent and which are not. Appendix C, called the Backlink file, includes a number of lower level functions that are called by functions in the LFG Contexts file; these are minor bookkeeping functions that are analogous to standard Medley functions but circumvent the disadvantage of the Medley garbage collector which does not reclaim circular structures.

Figure 4:
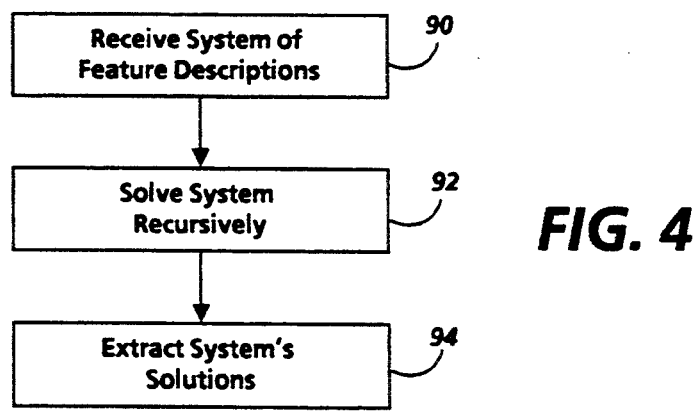
FIG. 4 is a flow chart showing general steps of an implementation of the invention for disjunctive unification of LFG feature descriptions.

FIG. 4 is a flowchart showing general steps in the execution of SOLVE in Appendix A. The system of feature descriptions to be solved is received in box 90. The step in box 92 solves the system of feature descriptions, performing recursively as necessary. The step in box 94 then extracts the solutions of the system, if any, from the results of the step in box 92.

We will first describe in detail the implementation of the step of solving recursively, concluding with a description of the somewhat less complicated implementation of the step of extracting solutions.

1. Solving Recursively

SOLVE treats the expression it receives in box 90 in FIG. 4 as a boolean combination of equations. That expression is analyzed from the outermost conjunction, through an iterative loop that begins with the step in box 100 and which is performed by the function SOLVEAND.

SOLVEAND handles each conjunct according to its relation, which may illustratively be equality or disjunction. The step in box 102 branches based on this relation. If the relationship is equality, SOLVEAND calls LOCATE to find the current values of the arguments and to convert equations into data structures; SOLVEAND then calls UNIFY to unify the data structures corresponding to the current values of the arguments, in box 104. In converting to data structures, LOCATE may in turn call LOCATE.VAR or LOCATE.AE, either of which may call CREATECONTEXTVALUE to create an entity of type Disjunction, which is a set of context-value pairs and therefore is a disjunctive value data unit as described above. If, rather than equality, the relationship is disjunction, SOLVEAND calls SOLVEOR to handle it, which begins an inner iterative loop in box 110. When unification in box 104 is complete or all the disjuncts have been handled in the inner iterative loop, SOLVEAND begins another iteration with the next conjunct, in box 100.

SOLVEOR handles each disjunct by obtaining a context identifier for it in box 112. A technique for implementing this step is discussed in greater detail below. Then, SOLVEOR branches in box 114 depending on whether the disjunct is a conjunction or a disjunction. If a conjunction, SOLVEOR provides it in box 116 in a recursive call to SOLVEAND, receiving the results in box 118, the entry and exit point of the recursive call being shown as X and X' in FIG. 5. Similarly, if a disjunction, SOLVEOR provides it in box 120 in a recursive call to SOLVEOR, receiving the results in box 122, entering and exiting at Y and Y'. In either case, SOLVEOR calls the function UNIFY.ASSIGNMENTS in box 124 to unify the results with the previous results, so that the results cumulatively reflect the current state of processing of the expression received in box 90. UNIFY.ASSIGNMENTS performs the step of associating the context identifier obtained in box 112 with the disjunct's data unit, obtained as the results in box 118 or box 122, so that SOLVEOR includes the general steps discussed above in relation to FIG. 2. Upon completion of the last conjunct, SOLVEAND provides the results to SOLVE, which returns them in box 130.

Although FIG. 4 shows general steps in solving recursively, we will consider some of the important features in greater detail. First we will examine how context identifiers are provided in the data structures. Then we will examine unification in greater detail, including techniques for creating and handling context identifiers and for reducing a data structure that includes context-value pairs to a better form for unification.

a. Data Structures with Context Identifiers

The data structures produced in executing the code of Appendices A, B, and C include f-structures, each a set of feature-value pairs, and disjunctive values, each a set of context-value pairs. Some of these data structures are produced in performing the steps in boxes 104, 112 and 124, for example.

Figure 6A:
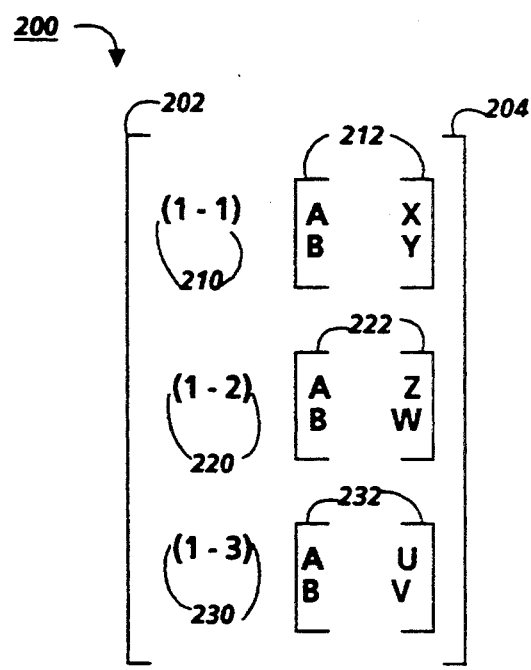
FIG. 6A is a schematic representation of a disjunctive value that includes a set of context identifiers paired with values according to the invention, each value being an f-structure that includes a set of feature-value pairs.
Figure 6B:
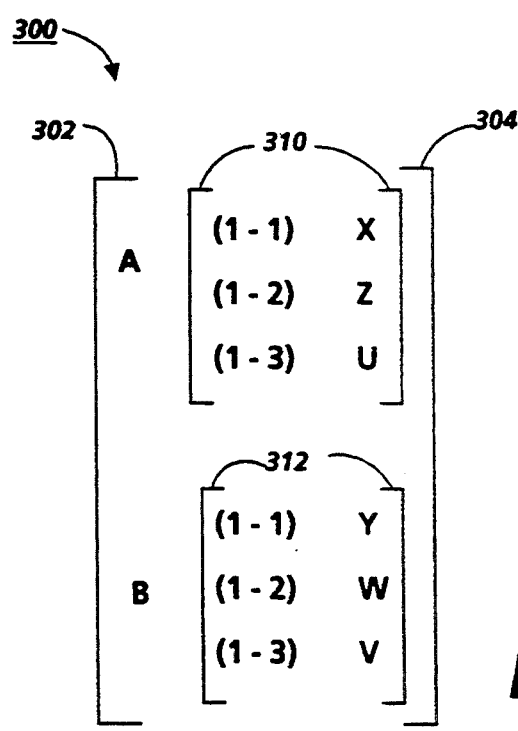
FIG. 6B is a schematic representation showing the result of reducing the disjunctive value of FIG. 6A.

FIG. 6A schematically represents disjunctive value 200, corresponding to a disjunctive system of feature descriptions and including context identifiers, each paired with a value that is an f-structure. FIG. 6B shows an equivalent form, f-structure 300, in which context-value pairs have been combined, yielding feature-value pairs in which each value is a disjunctive value. Disjunctive value 200, represented in FIG. 6A is equivalent to the following disjunction:

$$[(f_1 A) = X \wedge (f_1 B) = Y] \vee [(f_1 A) = 2 \wedge (f_1 B) = W] \vee [(f_1 A) = U \wedge (f_1 B) = V] \quad (1)$$

Disjunction (1) includes only one function, represented by the variable f, although the invention is equally applicable to disjunctions and disjunctive systems with multiple functions.

Disjunction (1) includes three disjuncts, each a conjunction of two feature-value equations for the function $f_1$. Disjunctive value 200 in FIG. 6A similarly includes three terms within outer brackets 202,204. Each term is a context-value pair that includes one of context identifiers 210, 220, 230, each in parentheses, and one set of feature-value pairs 212, 222, 232, each in brackets. The hierarchical relationships within data structure 200 thus parallel the relationships within data structures 22 and 24 in FIG. 1—brackets 202,204 correspond to the upper level; context identifiers 210,220, 230 correspond to the middle level; and sets of feature-value pairs 212,222, 232 correspond to the lower level.

Context identifiers 210,220,230 each include two numbers, in the form a-b, where a identifies a disjunction and b identifies a disjunct of the disjunction. The first, second, and third disjuncts of disjunction (1) are thus identified as 1-1, 1-2, and 1-3, respectively. As described above, these context identifiers keep track of disjuncts and their dependencies.

Although context identifiers 210, 220, 230 each include two numbers, any other appropriate data could be used as a context identifier, including, for example, a single binary code or a name that could be used to obtain data used in unification. Furthermore, more complex context identifiers can be formed as logical combinations of simple context identifiers, which are also referred to herein as choices. As will be seen in the discussion of unification, below, it is useful to be able to identify the disjunction and disjunct of a choice, because this makes it possible to determine which choices should be treated as genuine alternatives. Another approach that would be useful with the ATMS would be to assign a unique identifier for each choice and provide a pairwise no° good justification for each pair of choices that are genuine alternatives.

Each feature-value pair in sets of feature-value pairs 212,222,232 includes two tokens, the first corresponding to a feature and the second corresponding to a value that feature can take. Each set of feature-value pairs in FIG. 6A includes a pair for each of the features A and B, but does not include a pair for any other feature. Other features are conventionally treated as having the value NIL, meaning that no value is yet specified for such a feature.

Each set of feature-value pairs can be thought of as specifying the value of certain features in the corresponding context. Since a context is one of a set of alternatives, alternative contexts need not be consistent, so that a feature can have a different value in each context in a set of alternatives, as shown in FIG. 6A for features A and B.

FIG. 6B shows f-structure 300 which is equivalent to disjunctive value 200, but within which each feature has a disjunctive value. The f-structure 300 may be thought of as a reduced form of disjunctive value 200. It could be obtained by converting disjunctive value 200 to its reduced form by combining the context-value pairs shown in FIG. 6A, a technique discussed in greater detail below; it could alternatively be obtained directly from disjunction (1). Like disjunctive value 200, it has outer brackets 302 and 304, but rather than having three terms within its outer brackets, f-structure 300 has two terms-one each for the two feature tokens A and B that occur in disjunction (1). In addition to a respective feature token, each of the terms within outer brackets 302 and 304 also includes a set of inner brackets 310 and 312. The inner bracket in each term contains a disjunctive value for the respective feature token.

Inner brackets 310 thus contain A's disjunctive value, while inner brackets 312 contain B's. Like disjunctive value 200 in FIG. 6A, each disjunctive value in FIG. 6B includes three terms, one for each of the contexts in disjunction (1). Each term is a context-value pair that includes a context identifier and a value that the respective feature has in that context, in this case one of the values U, V, W, X, Y, and Z. The hierarchical relationships within f-structure 300 thus parallel the relationships within data structures 32, 34, and 40 in FIG. 1—brackets 302 and 304 correspond to the upper level; the feature tokens A and B correspond to the middle level; and the disjunctive values in inner brackets 310 and 312 correspond to the lower level.

The f-structure 300, although equivalent to disjunctive value 200, is a much better candidate for unification of data structures that include context identifiers. If disjunctive value 200 were unified with another disjunctive value, each pair of contexts would interact, so that the total number of contexts in the unified disjunctive value would be the product of the numbers of contexts in the two original disjunctive values. The f-structure 300 can be unified with another f-structure without any interaction between contexts, except that the contexts will interact in unifying the disjunctive values of a feature that occurs in both f-structures.

We turn now to examine in greater detail how disjunctive unification can be performed on data structures that include context identifiers, whether f-structures or disjunctive values.

2. Unification of Data Structures with Context Identifiers

A disjunctive system being solved in accordance with the invention may include both f-structures, like f-structure 300 in FIG. 6B, and disjunctive values, like disjunctive value 200 in FIG. 6A. Therefore, unification in accordance with the invention should be able to handle unification both of f-structures and of disjunctive values. The general purpose of unification, in any case, is to determine whether two entities that are conjoined to form a logical system can be unified into an entity that is a solution of that system, so that the system is satisfiable. In general, if the two entities being unified are f-structures, the unified entity is also an f-structure, and it may be obtained by appropriately modifying the two f-structures being unified so that one of them can serve as the unified entity. Similarly, if the entities being unified are disjunctive values, the unified entity is also a disjunctive value.

Figure 7:
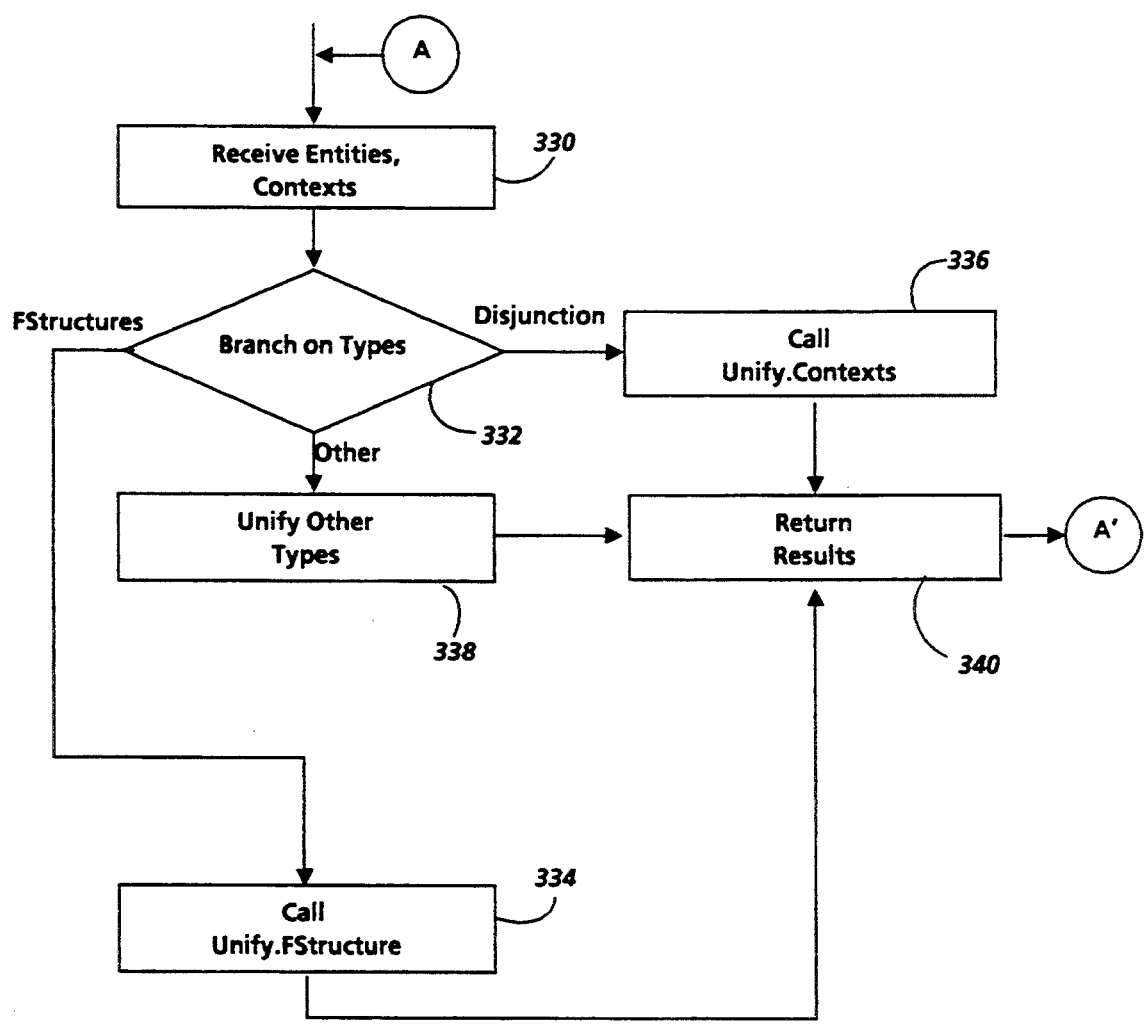
FIG. 7 is a flow chart showing steps in an implementation of unification according to the invention.
Figure 8:
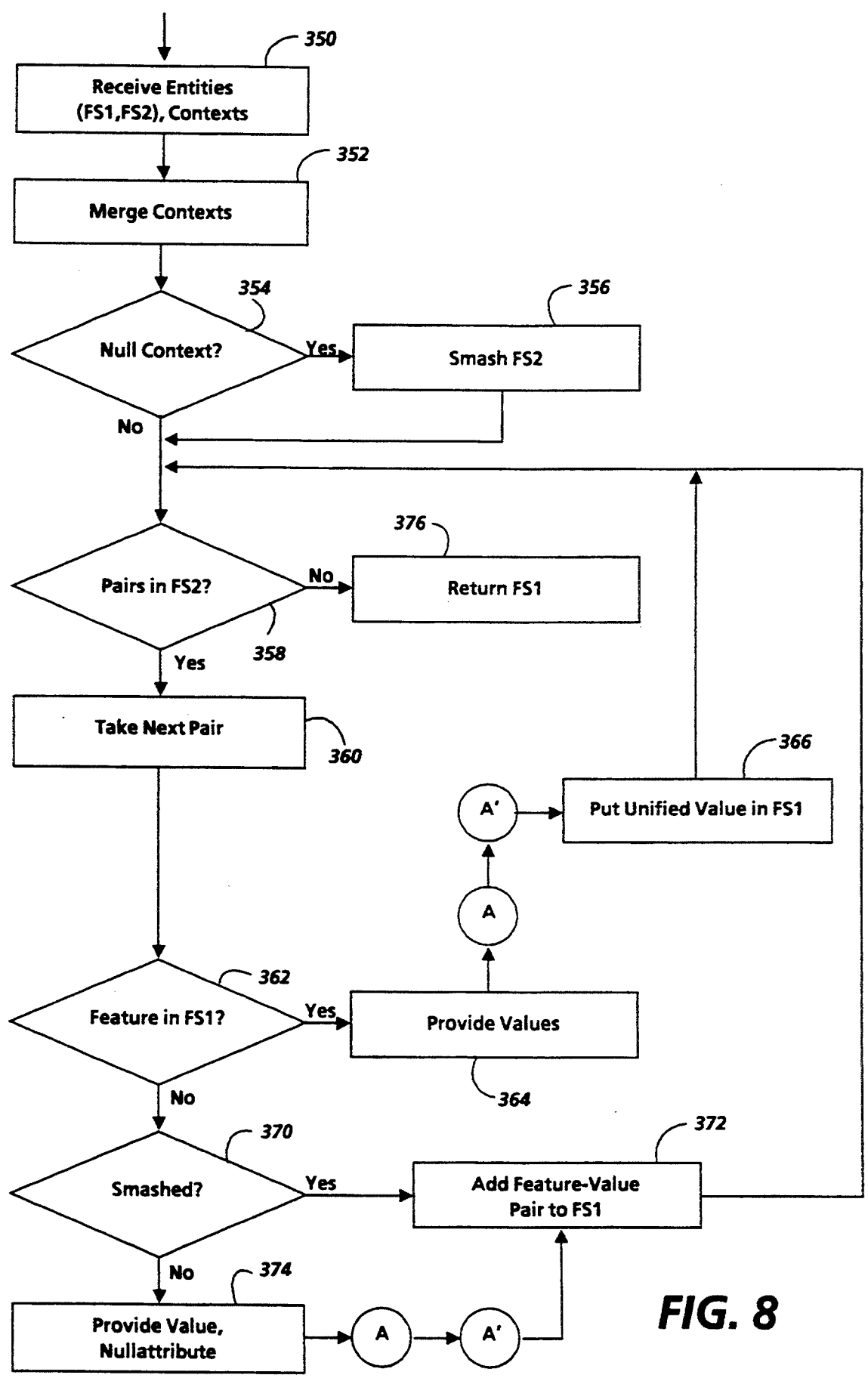
FIG. 8 is a flow chart showing steps in an implementation of unification of f-structures.
Figure 9:
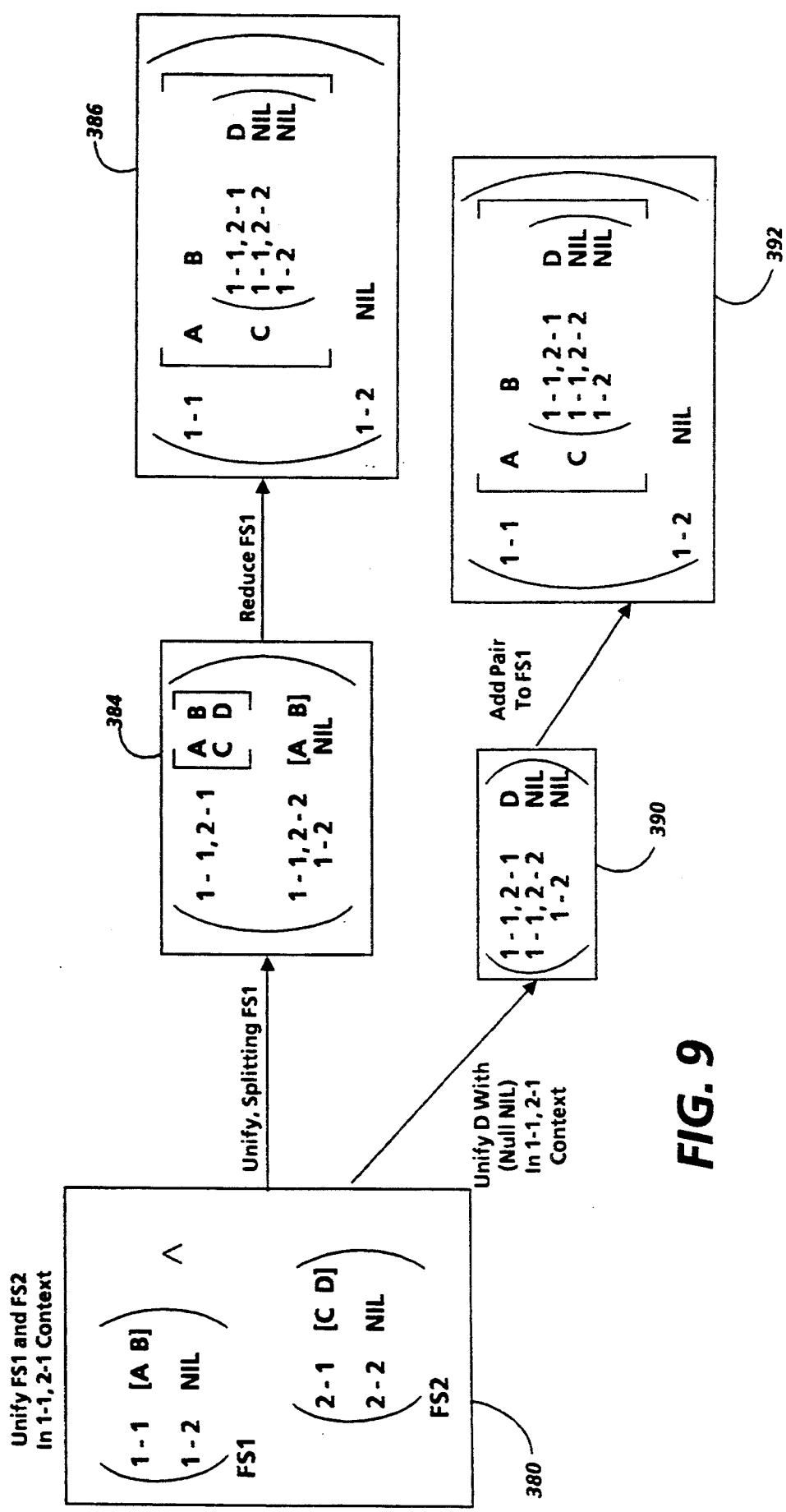
FIG. 9 is a schematic representation of alternative approaches to including a feature-value pair from one f-structure in another f-structure during unification in a context.
Figure 10A:
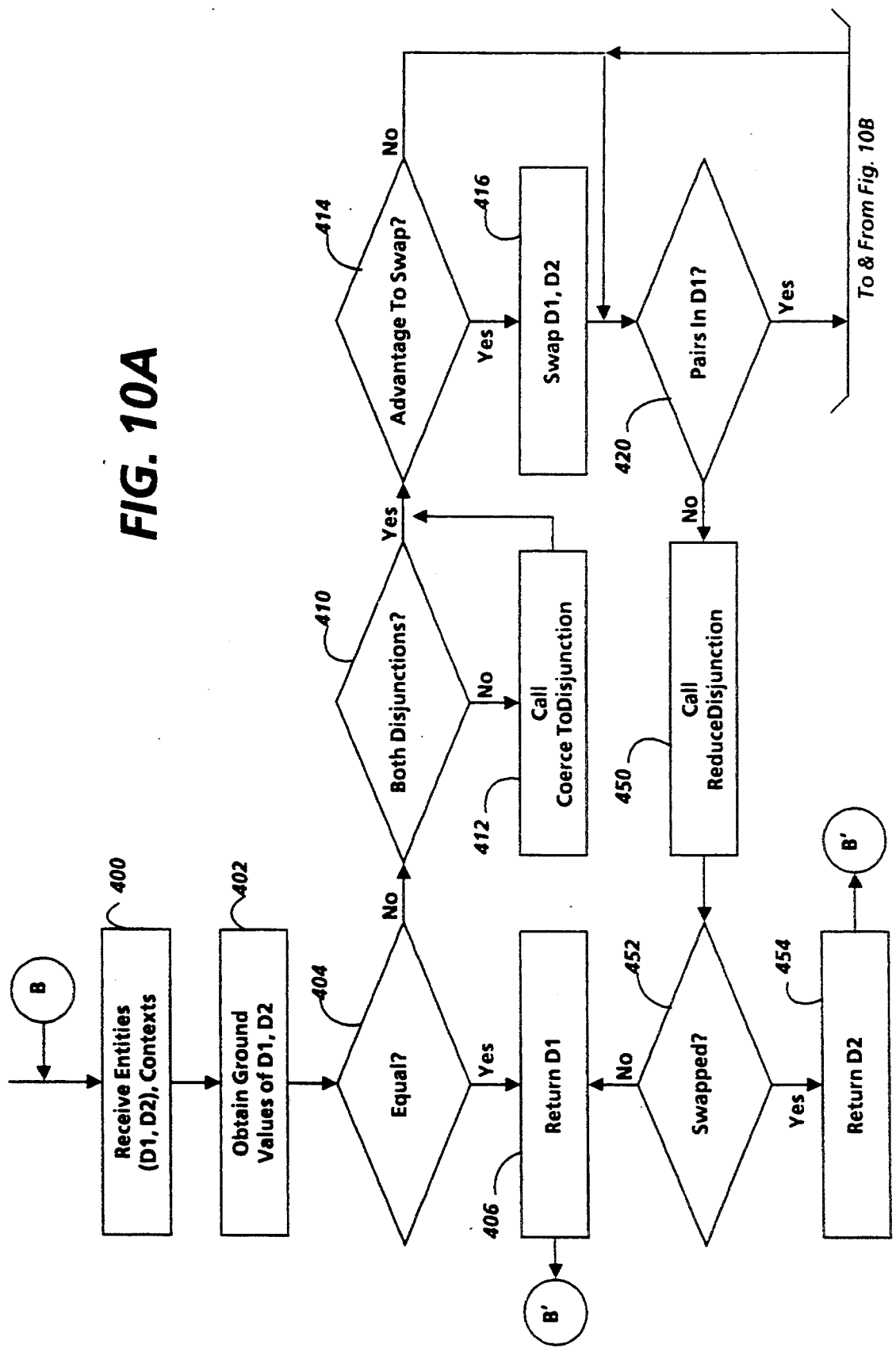
FIGS. 10A and 10B are flow chart showing steps in an implementation of unification of disjunctive values.
Figure 10B:
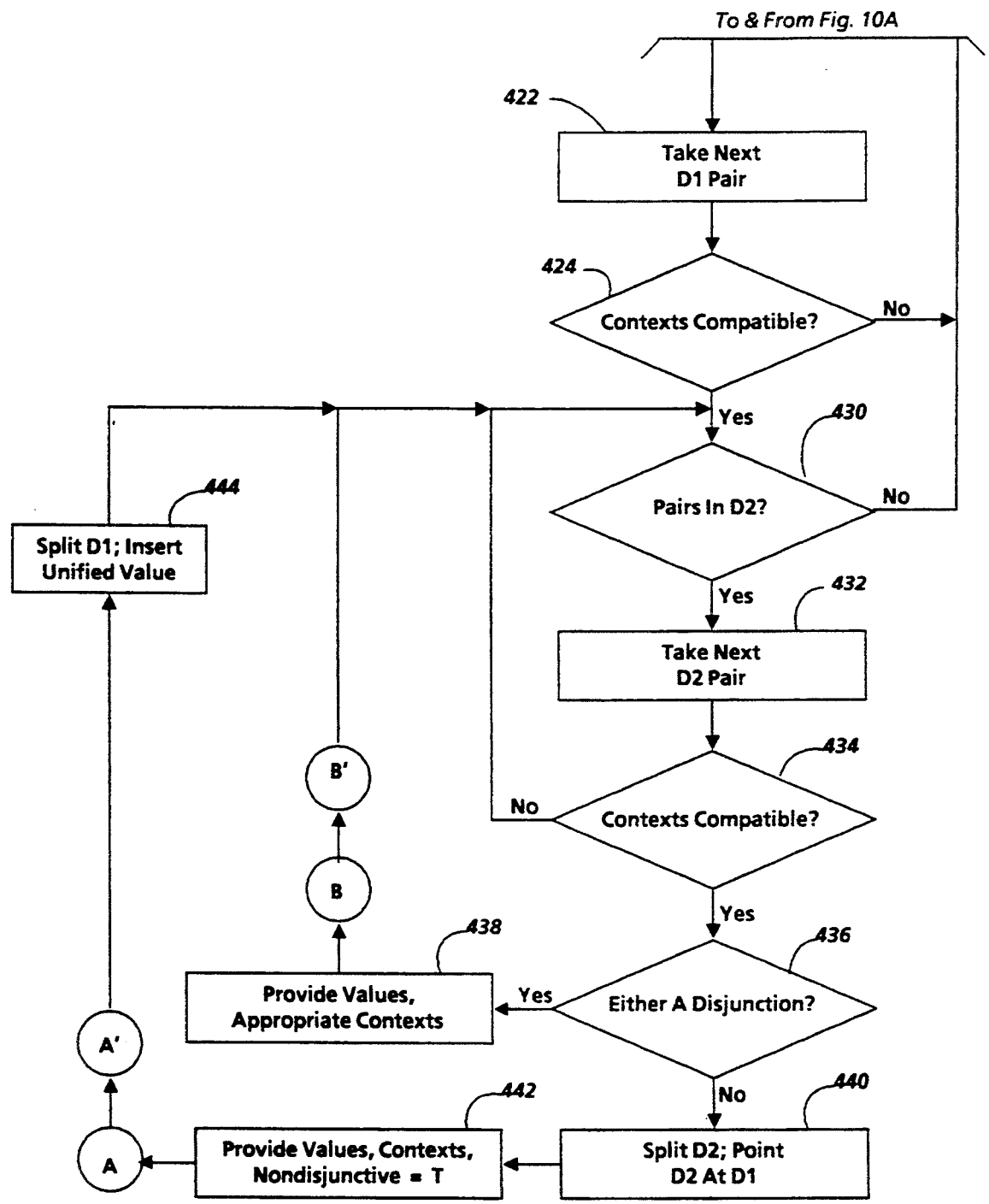

FIG. 7 illustrates general steps within the function UNIFY in Appendix A. FIG. 8 shows steps in UNIFY.FSTRUCTURE to unify two f-structures. FIG. 9 shows alternative approaches to including a feature-value pair from one f-structure in another. FIGS. 10A and 10B illustrate steps in UNIFY.CONTEXTS to unify two entities, at least one of which is a disjunctive value.

(i) UNIFY

As implemented in Appendix A, the general function that performs unification is UNIFY, which begins in box 330 by receiving the entities to be unified and their contexts. A context identifier indicates the context in which each entity can occur.

The entities to be unified may have been obtained by calling LOCATE, as discussed above in relation to box 104 in FIG. 5, or through other functions, examples of which are illustrated in FIG. 7 in relation to recursive calls to UNIFY. In the implementation of Appendix A, each entity can have one of several types-Nullattribute, Placeholder, Inconsistency, Symbol, Fstructure, and Disjunction, and the step in box 332 branches based on the types of the entities received in box 330. The branch that is taken when both entities are of "type F" structure is shown in greater detail in FIG. 8, and is initiated by calling UNIFY.FSTRUCTURE, in box 334. Another branch that is taken when one of the entities is of type Disjunction, meaning a disjunctive value, is shown in greater detail in FIGS. 10A and 10B, and is initiated by calling UNIFY.CONTEXTS, in box 336. The remaining branches are handled by unifying as appropriate, in box 338. After unification in box 34, box 336, or box 338, the result is returned in box 340.

The steps in boxes 334, 336, 338, and 340 thus include a number of possibilities, only one of which occurs. When the entities received in box 330 have already been unified, no further unification is necessary, so that the step in box 338 provides one of them to be returned as the result in box 340. Otherwise, if UNIFY was called without a boolean value indicating the entities should be unified nondisjunctively and if at least one of the entities has a context other than the NULL context, the universal context that includes all contexts, the step in box 336 occurs, resulting in a call to UNIFY.CONTEXTS, and the result of that call is returned in box 340. If neither of the above possibilities applies and if either entity is of type Nullattribute, a special symbol that unifies with anything, the step in box 338 selects the other entity to be returned as the result in box 340. If none of the above applies, the step in box 336 calls UNIFY.CONTEXTS if either of the entities is of type Disjunction, and the result is returned in box 340. If not, then if either of the entities is of type Inconsistency, the step in box 338 calls UNIFY.INCONSISTENCY to record the context's inconsistency and to produce the resulting entity, also of type Inconsistency, which is returned in box 340. Otherwise, if either of the entities is of type Placeholder, which unifies with anything, the step in box 338 calls UNIFY.PLACEHOLDER to do the unification and return the other entity as the result in box 340. Otherwise, if either of the entities is of type Symbol, the entities must be inconsistent values because UNIFY has already determined that they are not equal; therefore, the step in box 338 calls UNIFY.INCONSISTENCY as described above to handle the inconsistency, and the result is returned in box 340.

In general, when UNIFY calls another function, it passes not only the entities to be unified by that function but also the contexts it received in box 330. This permits unification in a context other than the NULL context, under which the only subentities that are unified are those whose contexts are not genuine alternatives of the context in which unification is being performed. An example of this is shown in FIG. 9, discussed below.

(ii) UNIFY.FSTRUCTURE

The call to UNIFY.FSTRUCTURE in box 334 initiates the steps shown in FIG. 8. UNIFY.FSTRUCTURE begins in box 350 by receiving the two f-structures, referred to as "FS1" and "FS2." UNIFY.FSTRUCTURE also receives their contexts. As noted above, UNIFY.FSTRUCTURE is only called when UNIFY is called with a boolean value indicating the f-structures should be unified nondisjunctively or when both of the f-structures have the NULL context, since UNIFY.CONTEXTS would be called if both of those conditions were met. UNIFY.FSTRUCTURE calls MERGECONTEXTS in box 352 to merge the contexts of the two f-structures. The contexts could alternatively be merged by a higher level procedure, prior to the call to UNIFY. The operation of MERGECONTEXTS is discussed in greater detail below. The test in box 354 determines whether the result of merging the contexts is the NULL context, the universal context that includes all contexts and which will be the result if both f-structures have the NULL context. If so, the step in box 356 smashes the two f-structures, meaning that FS2 becomes a pointer to FS1, and FS1 will contain the unified f-structure.

UNIFY.FSTRUCTURE then proceeds iteratively through the feature-value pairs in FS2, in a loop that begins with the test in box 358. For the next pair in FS2, obtained in box 360, the test in box 362 determines whether any of the feature-value pairs in FS1 has the same feature. If so, the values of the two pairs with the same features are provided in box 364 in a recursive call to UNIFY, entering and exiting the steps in FIG. 7 at A and at A', respectively. The unified value is then included in the pair in FS1, in box 366, before returning to box 358 to continue to the next pair.

If the test in box 362 determines that none of the pairs in FS1 has the same feature as the pair from FS2, the test in box 370 determines whether FS2 was smashed in box 356. If so, all that is necessary is to add the feature-value pair from FS2 to FS1, in box 372. But if FS2 was not smashed, the step in box 374 makes a recursive call to UNIFY, providing two values-the value (NULL NIL), which is a disjunctive value that includes one context-value pair, and the value from the pair in FS2—and entering and exiting the steps in FIG. 7 at A and at A', respectively; then, the feature from the pair in FS2 and the resulting unified disjunctive value are included in FS1, in box 372. The recursive call in box 374 is explained in greater detail below in relation to FIG. 9.

When all the pairs in FS2 have been handled in this manner, the step in box 376 returns FS1 to the procedure that called UNIFY. The returned version of FS1 is thus the unified f-structure.

The importance of the step in box 374 is illustrated in FIG. 9, showing two different approaches that could be followed in including an unsmashed feature-value pair in FS1. The disjunctive values being unified in box 380 are disjunctive values referred to as "FS1" and "FS2," and they are being unified in the 1-1, 2-1 context. As explained in greater detail below in relation to reduction, the context-value pairs within either FS1 or FS2 cannot be combined because their values are of incompatible types that cannot be reduced. FS2 is unsmashed because, as determined in box 354 in FIG. 8, the merged context is not the NULL context, but rather the context 1-1,2-1.

A rigorous and straightforward approach would be to unify the two disjunctive values, splitting the first context-value pair in FS1 into two contexts, 1-1, 2-1 and 1-1, 2-2, as shown in box 384. This approach requires, however, the further step of reducing FS1 after unification by combining the two resulting context-value pairs that have values of type Fstructure, which would provide disjunctive values for A and C, as shown in box 386. This additional step is computationally expensive, so that this approach is undesirable even though it yields a correct result.

An alternative approach is the approach followed in the steps in boxes 374 and 372 in FIG. 8. First, a disjunctive value with the context-value pair (NULL NIL) is provided, to indicate explicitly that the feature "C" does not have a value in the 1-1 context in FS1. This disjunctive value is then unified in the 1-1, 2-1 context with the value "D" from the feature-value pair for the feature "C" from FS2 in the 2-1 context. This produces a disjunctive value as shown in box 390. This disjunctive value is then associated with the feature "C" from the feature-value pair from FS2 to form a feature-value pair. If FS2 included more than one feature-value pair in the 2-1 context, a disjunctive value for each pair could be similarly produced to form a set of feature-value pairs, i.e. an f-structure. The feature-value pairs in this f-structure are then added to FS1 in the 1-1 context, to produce the same result in box 392 as if the rigorous approach described above had been followed.

This second approach, illustrated in boxes 390 and 392, works because it obtains a disjunctive value directly that would otherwise be obtained by reducing FS1. In general, unifying a value with a disjunctive value that includes only the context-value pair (NULL NIL) in a context other than the NULL context produces such a disjunctive value, through the operation of UNIFY.CONTEXTS, discussed below. This approach is more efficient than the approach illustrated in boxes 384 and 386 because it builds the "same disjunctive values without the computational difficulties of splitting and reduction.

(iii) UNIFY.CONTEXTS

As described above, UNIFY calls UNIFY.CONTEXTS in two situations: In one situation, UNIFY was called without a boolean value indicating the entities should be unified nondisjunctively and at least one of the entities to be unified has a context other than the NULL context. In the other situation, UNIFY was called with a boolean value indicating the entities should be unified nondisjunctively or both the entities to be unified have the NULL context, but at least one of the entities is of type Disjunction, meaning it is a disjunctive value. In addition, UNIFY.CONTEXTS can make a recursive call to itself.

FIGS. 10A and 10B show steps in UNIFY.CONTEXTS in response to a call. A call to UNIFY.CONTEXTS includes two entities, referred to as "D1" and "D2," and the context in which they are being unified, which can be provided by providing the context of each entity or by providing their merged context. UNIFY.CONTEXTS receives these items in the step in box 400.

The step in box 402 obtains the ground values of D1 and D2, by calling GETDGROUND, a function that removes any unnecessary disjunction pointers. As discussed in greater detail below, pointers can be included in the entities being unified as a part of unification, but at this point the objective is to find the entity to which the pointers lead, so the pointers are removed. Elsewhere, the function GETGROUND is called for a similar purpose.

The test in box 404 determines whether the ground values of D1 and D2 are equal. If so, they have already been unified, so that D1 is returned in box 406 as the result of unification.

The test in box 410 determines whether D1 and D2 are of type Disjunction. If either entity is not of type Disjunction, the step in box 412 calls COERCETODISJUNCTION to convert it into an entity of type Disjunction, which can be done by copying the non-disjunction entity and then smashing the original to be an entity of type Disjunction with a single context-value pair, the context being the NULL context and the value being the copy of the non-disjunctive entity.

When both D1 and D2 are of type Disjunction, the test in box 414 determines whether it would be more advantageous to treat them in the opposite order. In other words, during unification, pointers will be inserted from D2 to D1, but it may be advantageous to have pointers from D1 to D2 if both D1 and D2 are in the NULL context. This would be advantageous, for example, if D2 has the NULL context in its first context-value pair while D1 has another context in its first context-value pair, or if D2 has a more specific type than D1, such as type Fstructure as opposed to type Placeholder. In general, swapping may be advantageous if it reduces the number of splits, while it may be disadvantageous if it increases the number of pointers. If swapping would be advantageous, the step in box 416 swaps D1 and D2.

The test in box 420 begins an outer iterative loop that handles each of the context-value pairs in D1, comparing it with each of the context-value pairs in D2 in an inner iterative loop, and unifying the pairs if appropriate, as in FIG. 3, discussed above. If any of the pairs in D1 remain to be handled in this manner, the next pair is taken in box 422. The test in box 424 calls MERGECONTEXTS, discussed below in greater detail, to determine whether the context in the pair being handled is compatible with the context received in box 400. If the two are not compatible, UNIFY.CONTEXTS returns to the test in box 420 to handle the next context-value pair in D1.

The test in box 430 begins the inner iterative loop in which each context-value pair in D2 is handled. If any of the pairs in D2 remain to be handled, the next pair is taken in box 432. The test in box 434 calls MERGECONTEXTS both to determine whether the context in the pair from D2 is compatible with the context received in box 400 and also to determine whether it is compatible with the context in the pair from D1 currently being handled. If it is incompatible with either of the other contexts, UNIFY.CONTEXTS returns to the test in box 430 to handle the next context-value pair in D2.

If their contexts are compatible, the values in the two context-value pairs can be unified. If the test in box 436 determines that either of the values is an entity of type Disjunction, the values can be unified by an appropriate recursive call to UNIFY.CONTEXTS, providing the values and the appropriate contexts in box 438 and entering and exiting the steps in FIGS. 10A and 10B at B and B', respectively. On the other hand, if neither of the values is an entity of type Disjunction, the pair from D2 is first split through a call to EXPANDCONTEXTPAIR, discussed in greater detail below. The pair from D2 is also set to point to D1, in the step in box 440. Then, the values, the merged contexts, and a boolean value indicating the entities should be unified nondisjunctively are provided in a recursive call to UNIFY in box 42, entering and exiting the steps in FIG. 7 at A and A', respectively. The effect of this boolean value was discussed above in relation to boxes 336 and 38 in FIG. 7. When UNIFY returns, the pair from D1 is split through a call to EXPANDCONTEXTPAIR if necessary, as above, and the unified value is paired with the appropriate context in the split version of the pair from D1, in box 444. Splitting will not be necessary, however, if the unified value is of a type that is type compatible with the value from the pair in D1; if COMPATI- BLEENTITIES determines they have compatible types, the unified value simply replaces the value in the pair in D1. This will be the case, for example, if both values are of type Fstructure. After unification, UNIFY.CONTEXTS returns to the test in box 430 to handle the next context-value pair in D2.

When all the pairs in D2 have been handled, UNIFY.CONTEXTS returns to the test in box 420 to handle the next context-value pair in D1. When all the pairs in D1 have been handled, the step in box 450 calls REDUCEDISJUNCTION, discussed in more detail below, to convert the unified version of D1 and D2 to the reduced form with disjunctive values. Then, the test in box 452 determines whether a swap was performed in box 416. If not, D1 is returned, in box 406, but if so, D2 is returned in box 454.

Both UNIFY.CONTEXTS and UNIFY.FSTRUCTURE call functions such as MERGECONTEXTS to perform operations on context identifiers. We turn now to examine in greater detail how context identifiers are handled in the implementation of Appendices A, B, and C.

c. Context Identifiers

Figure 11:
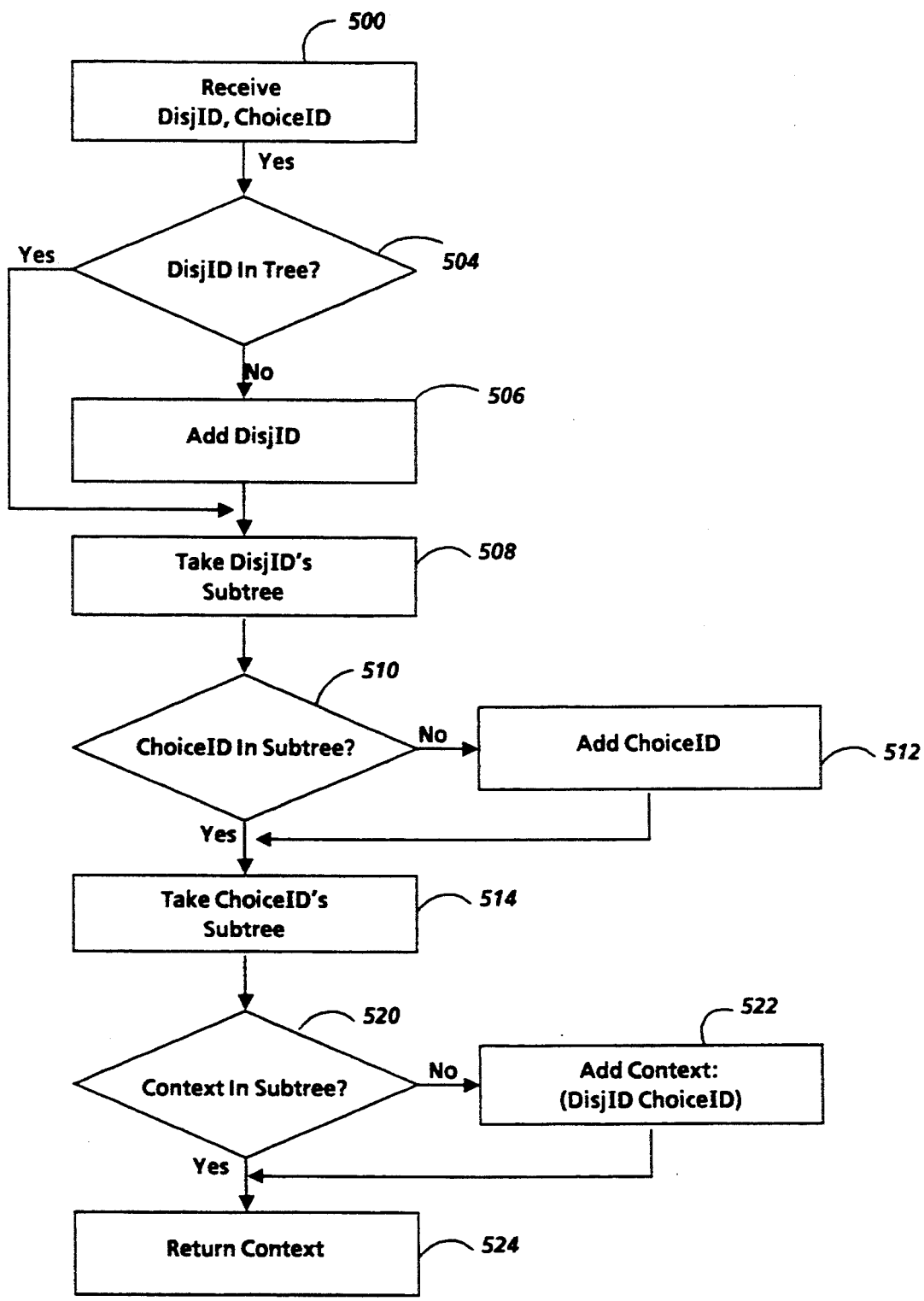
FIG. 11 is a flow chart showing steps in creating a context, as occurs in FIG. 5.
Figure 12A:
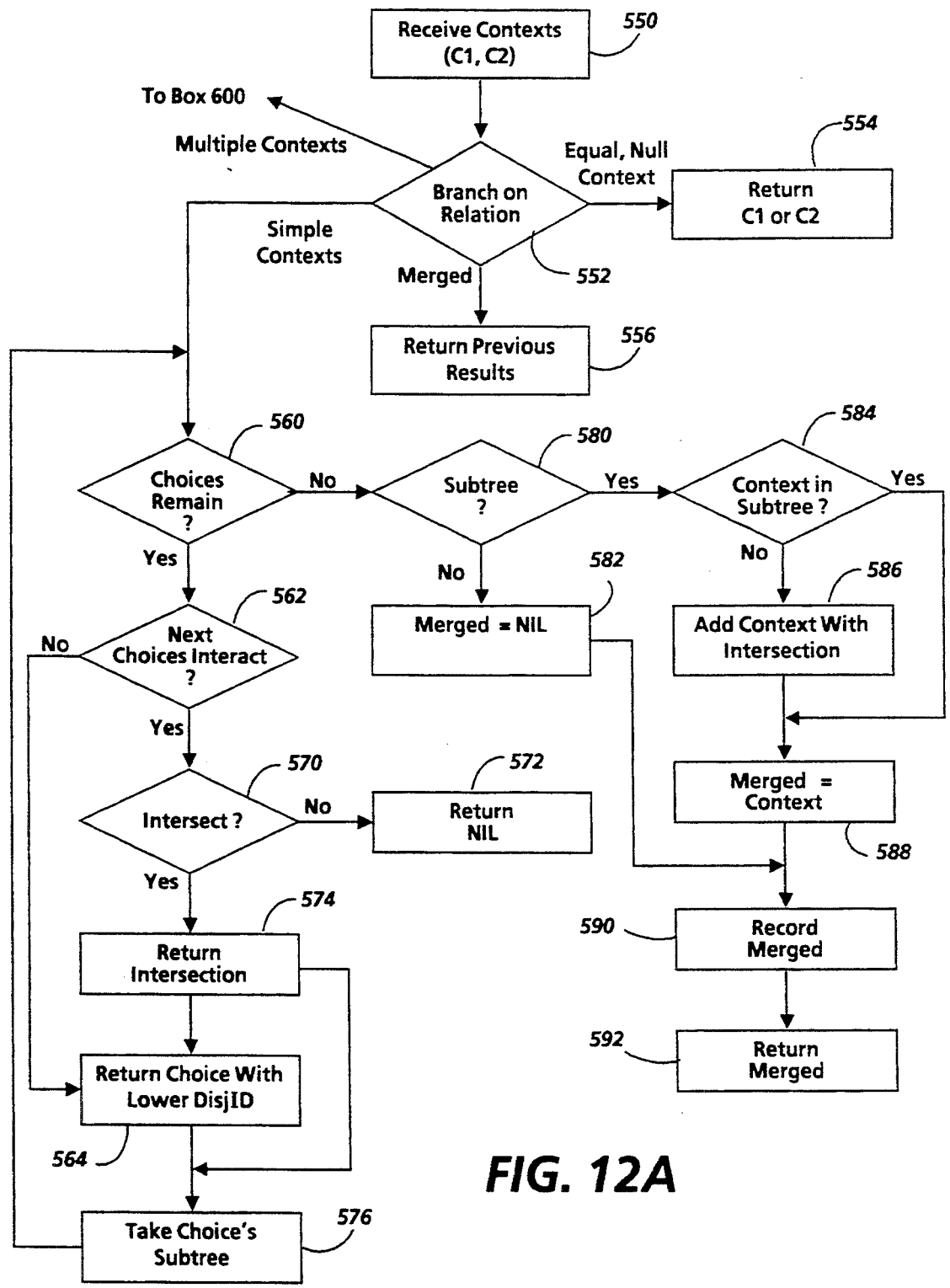
FIG. 12A is a flow chart showing steps in merging a context into another context, as occurs in FIGS. 5, 8, and 10B.
Figure 12B:
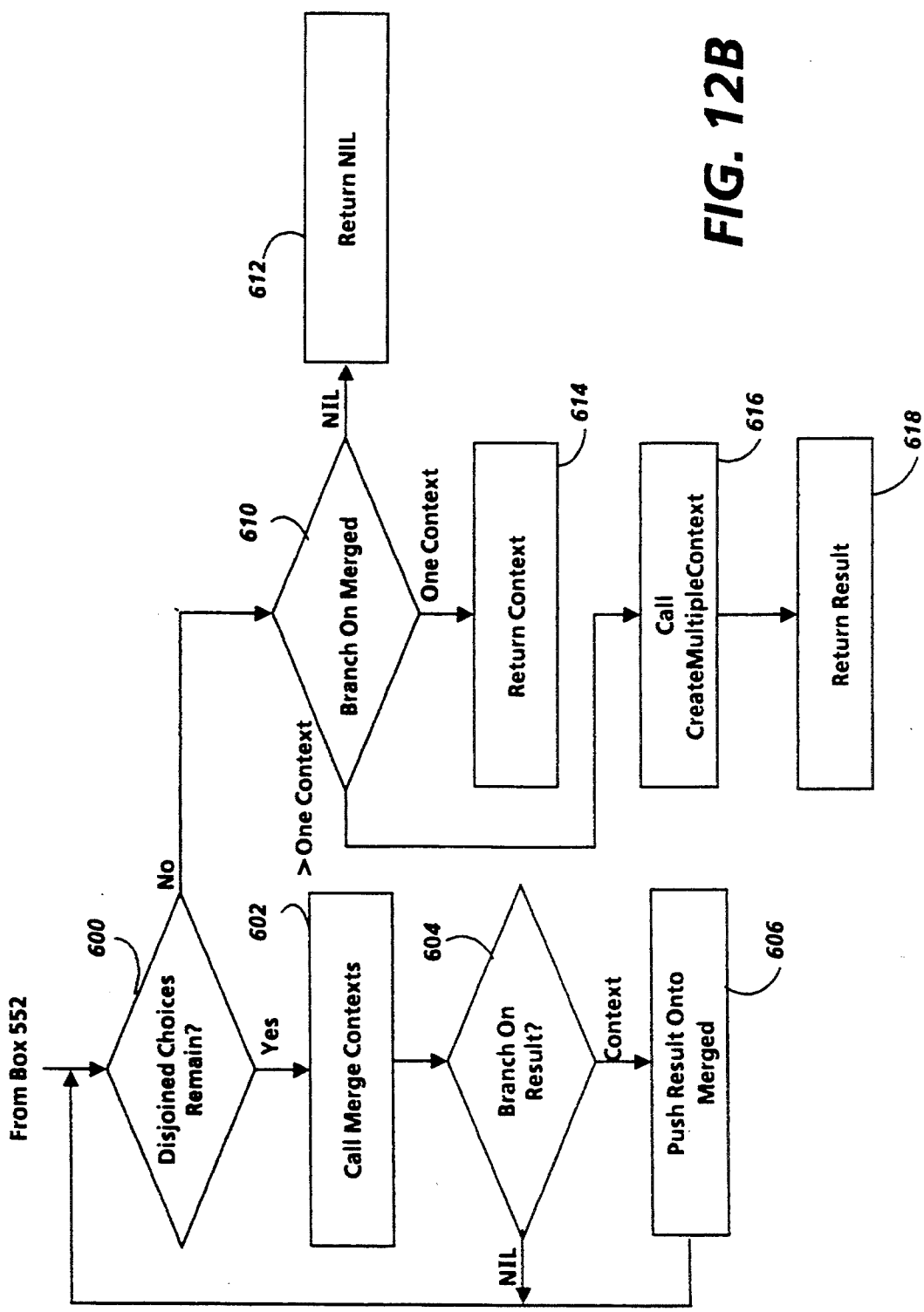
FIG. 12B is a flow chart showing additional steps in the function of FIG. 12A for merging a context that is a disjunction of choices.
Figure 13:
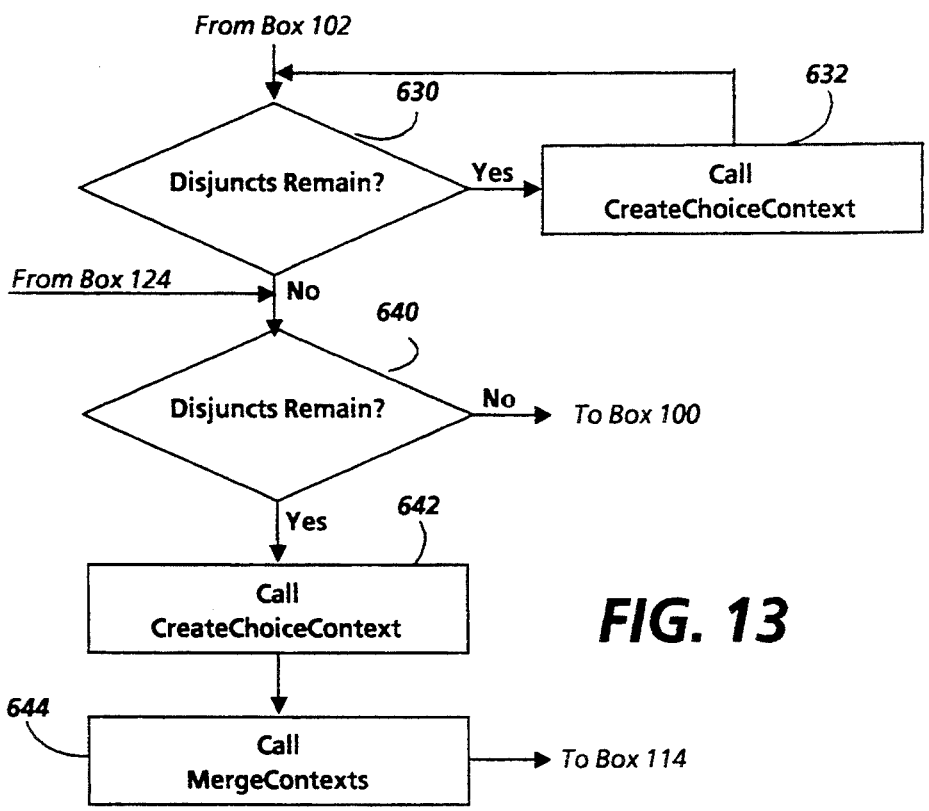
FIG. 13 is a flow chart showing how part of the procedure of FIG. 5 can be implemented using the procedures in FIGS. 11, 12A, and 12B.
Figure 14:
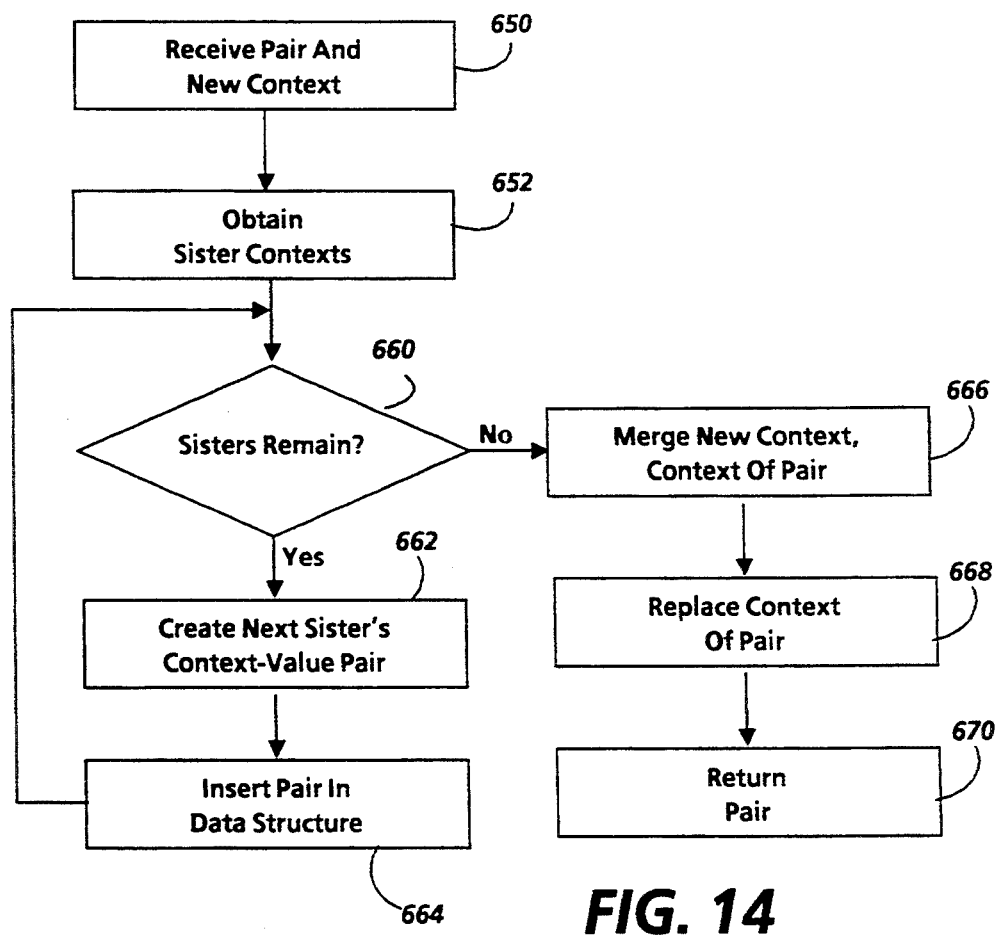
FIG. 14 is a flow chart showing steps in splitting a context-value pair, as occurs in FIG. 10B.
Figure 15:
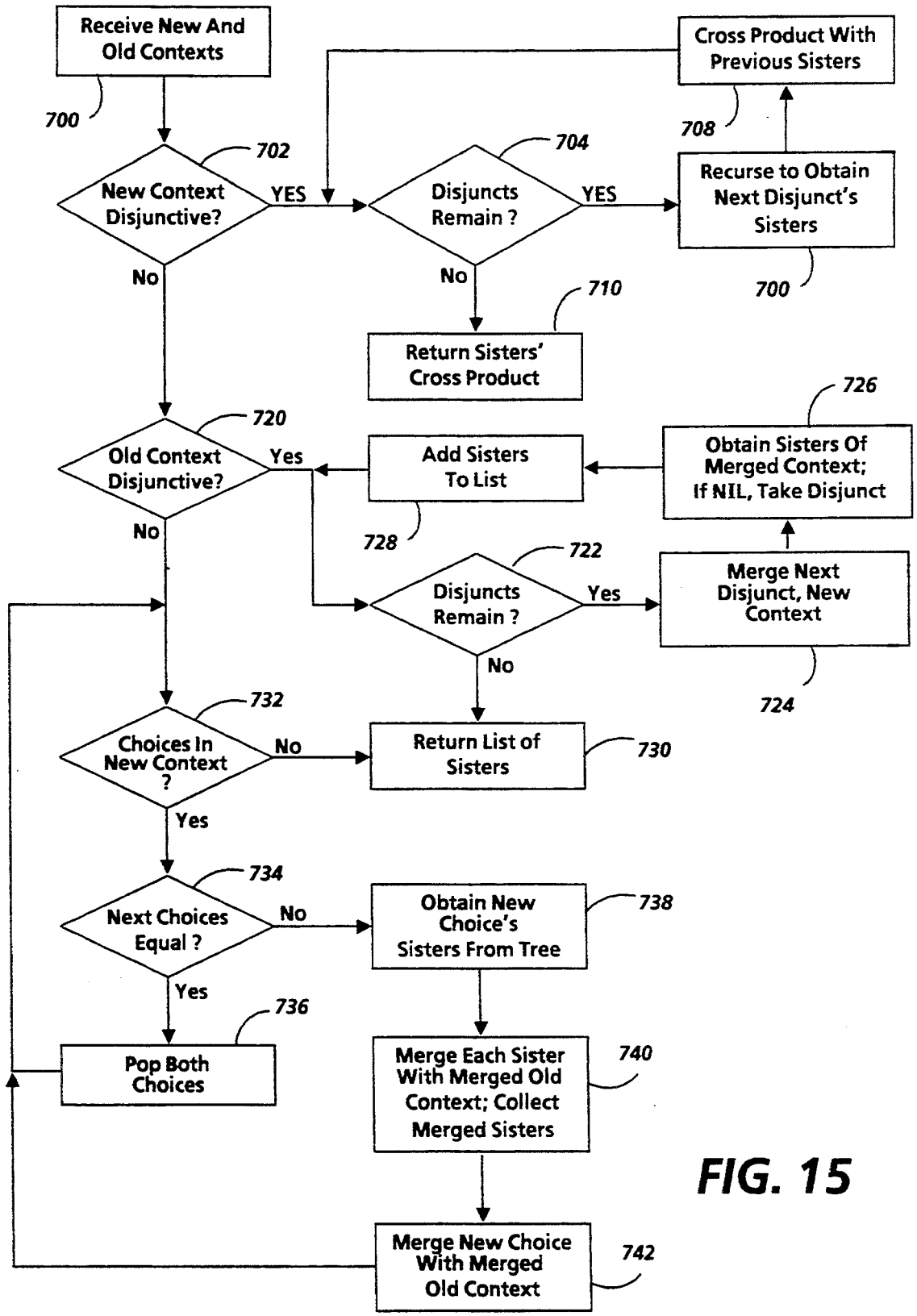
FIG. 15 is a flow chart showing steps in obtaining sister contexts in FIG. 14.

As implemented in Appendices A, B, and C, a context identifier is a list of pairs called "choices," each choice including a disjunction identifier and a choice identifier identifying one of the disjuncts of that disjunction. FIG. 11 shows steps in creating a context identifier, a function performed in box 112 in FIG. 5. FIGS. 12A and 12B show steps in merging a context into another context, a function also performed in box 112 in FIG. 5 and at several other places, including box 352 in FIG. 8 and boxes 424 and 434 in FIG. 10B. FIG. 13 shows how the functions in FIGS. 11, 12A, and 12B can be used to perform part of the function in FIG. 5. FIG. 14 shows steps in expanding or splitting a context pair, as in boxes 440 and 444 in FIG. 10B. FIG. 15 shows steps in obtaining a context's sister contexts, as in box 652 in FIG. 14.

FIG. 11 shows steps in CREATECHOICECONTEXTS, a function in Appendix B that is called by SOLVEOR to create a context identifier. CREATECHOICECONTEXTS maintains a record of the context identifiers it has previously created using the global variable LFGCONTEXTTREE. Therefore, CREATECHOICECONTEXTS first checks whether it has already created a context identifier for a given disjunction and disjunct, and creates a context identifier if not.

CREATECHOICECONTEXTS is called, in box 500, with a disjunction identifier (DisjID) and disjunct identifier (ChoiceID). The test in box 504 determines whether the any of the subtrees of LFGCONTEXTTREE begin with DisjID. If not, the step in box 506 adds a subtree beginning with DisjID to LFGCONTEXTTREE. The step in box 508 then takes the subtree that begins with DisjID for further handling.

The test in box 510 next determines whether the DisjID's subtree has a further subtree that begins with the ChoiceID received in box 500. If not, the step in box 512 adds a subtree beginning with ChoiceID to the DisjID's subtree of LFGCONTEXTTREE. Then the step in box 514 takes the subtree that begins with ChoiceID for further handling.

The test in box 520 determines whether the subtree that begins with ChoiceID has a context identifier at this level of LFGCONTEXTTREE. If not, the step in box 522 adds a context, the context being a list with elements DisjID and ChoiceID. If DisjID is NIL, the DisjID from the context identifier of the current context is used instead. Then, in box 524, the context identifier is returned.

FIG. 12A shows steps in MERGECONTEXTS, a procedure that is called by SOLVEOR and elsewhere to combine two context identifiers by merging one context identifier into another. MERGECONTEXTS determines whether the two context identifiers are compatible, meaning that they do not correspond to genuine alternative contexts. As shown below, MERGECONTEXTS returns NIL if the context identifiers are incompatible, but returns a merged context if they are compatible. The context-value pairs in the merged context are sorted according to disjunction identifier, from the lowest to the highest, and MERGECONTEXTS treats all disjunctions as exclusive to obtain the most general solutions.

MERGECONTEXTS receives the contexts, indicated as "C1" and "C2," from the procedure that calls it, as shown in box 550. The step in box 552 branches based on the relationship between C1 and C2. If the two are equal, C1 is returned and if one is of type Nullcontext, the other is returned, in box 554. If C1 and C2 have been merged previously, as can be determined from a record of merged contexts, the result of the previous merge is retrieved from the record and returned, in box 556. FIG. 12B, discussed below, shows steps followed if either C1 or C2 is a disjunction of choices. In other cases, it is necessary to go through the choices in C1 and C2 to determine their intersection, if any.

The test in box 560 begins an iterative loop that goes through the choices in C1 and C2, taking the next choice from both C1 and C2 until no choices remain in either C1 or C2. The test in box 562, performed implicitly by the NEXTCHOICE macro in Appendix B, determines whether the next choices in C1 and C2 have the same disjunction identifier. NEXTCHOICE does this through a series of steps that include returning as the next choice the next choice from one of C1 or C2 if the other has no more choices, or if both have a next choice, by returning as the next choice the one with the lower disjunction identifier, in box 564. But if both have a next choice and neither has a lower disjunction identifier, the disjunction identifiers are equal. In this case, if the choice identifiers are equal, the choice is returned; if they are not equal, NIL is returned.

When NEXTCHOICE returns a non-NIL value as the next choice, MERGECONTEXTS obtains the subtree of that next choice from LFGCONTEXTTREE or from the previously obtained subtree by calling GETCHOICETREE, in box 576. Then, MERGECONTEXTS returns to the test in box 560 to handle the next choices.

When all the choices from both C1 and C2 have been handled in this manner, the test in box 580 determines whether a non-NIL subtree has been obtained in the last iteration of box 576. If not, the variable Merged is set to NIL, in box 582. But if a subtree was obtained, the test in box 584 determines whether the subtree has a context. If not, a context is added by calling NEXTCHOICE to provide the intersecting set of choices, in box 586. Then, in box 588, Merged is set to the context. The step in box 590 records that C1 and C2 have been merged and that Merged was the result, and Merged is then returned in box 592.

FIG. 12B shows steps that can be followed if one of the contexts received in box 550 in FIG. 12A is a disjunction of choices. Therefore, the steps in FIG. 12B are an additional branch from box 552 in FIG. 12A. The test in box 600 begins an iterative loop that goes through the disjoined choices. If one of the contexts is a disjunction and the other is not, this step involves taking each of the disjoined choices in a pair with the context that is not a disjunction. But if both contexts are disjunctions, this step involves taking every combination of the pairs of disjoined choices, each pair including one choice from each of the contexts.

The pair is provided in a call to MERGECONTEXTS in box 602, and the step in box 604 branches on the result of MERGECONTEXTS. If the result is a merged context, the merged context is pushed onto Merged. But if the result is NIL, indicating the pair were incompatible contexts, the function simply returns to the step in box 600 to handle the next pair.

When all the pairs have been considered, the step in box 610 branches on Merged. If Merged is NIL, NIL is returned in box 612, indicating that the contexts are genuine alternatives and therefore incompatible. If Merged includes only one context, that context is returned in box 614. But if Merged includes more than one context, the step in box 616 calls CREATEMULTIPLECONTEXT, a function in Appendix B that creates a context identifier representing a disjunction of contexts. The result from CREATEMULTIPLECONTEXT is returned in box 618.

MERGECONTEXTS could instead be implemented with a propositional reasoner such as the ATMS, described above. If so, MERGECONTEXTS could be arranged to return NIL whenever the resulting context includes a context that had previously been found to contain an inconsistency, which would save further computation. An efficient implementation of the ATMS, such as that described in copending, coassigned U.S. patent application Ser. No. 205,125, now issued as U.S. Pat. No. 5,088,048 entitled "Massively Parallel Assumption-Based Truth Maintenance," incorporated herein by reference, could provide a more rapid determination of whether contexts are inconsistent, treating each disjunct as an assumption and treating a set of disjuncts that are genuine alternatives as a closed and exclusive class restriction. Inconsistent contexts could be identified at readout.

Figure 5:
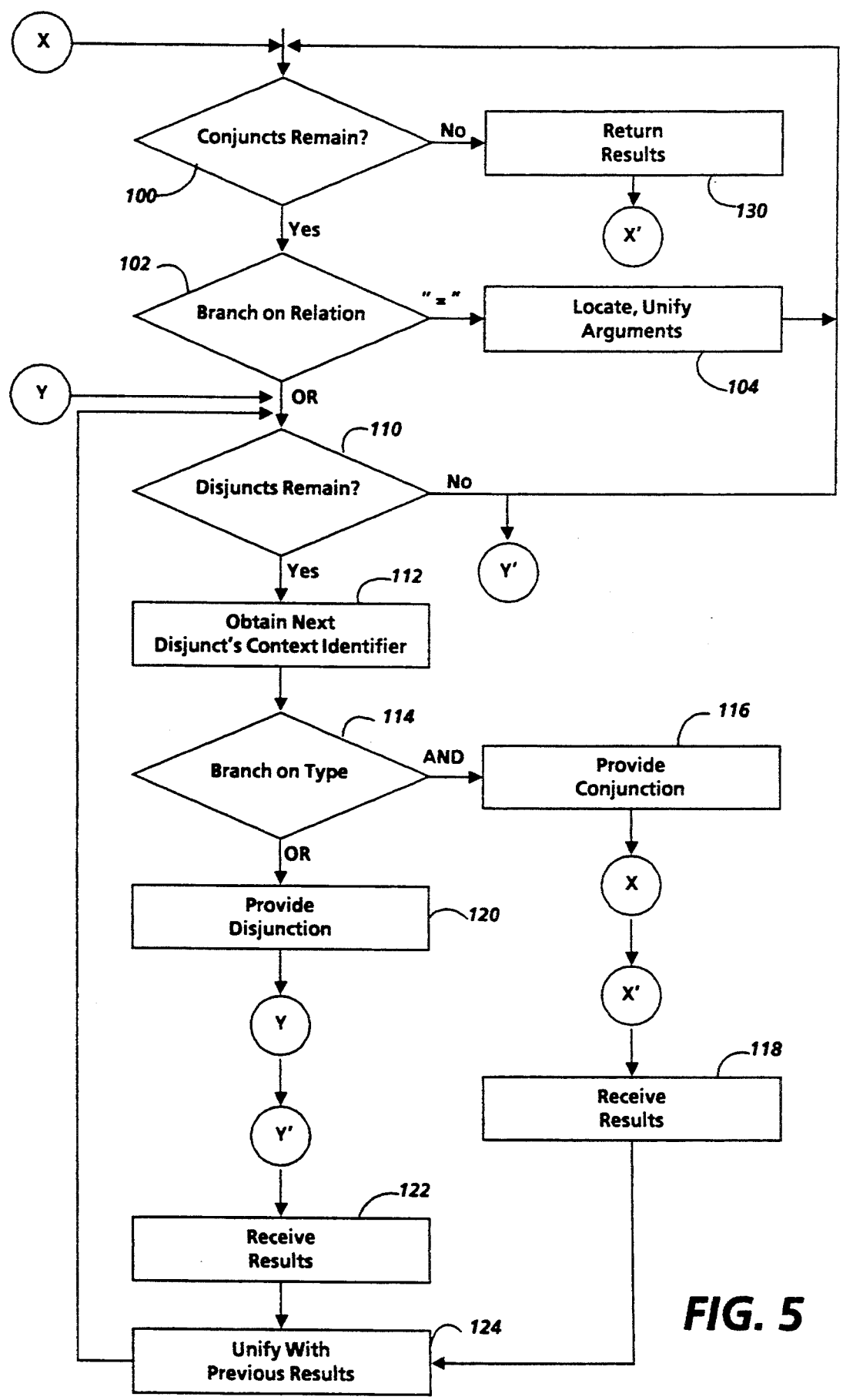
FIG. 5 is a flow chart showing an implementation of the step of recursively solving the feature descriptions in FIG. 4.

FIG. 13 shows how the functions of FIGS. 11, 12A, and 12B can be used to perform part of the function in FIG. 5. The steps in FIG. 13 implement the steps in boxes 110 and 112 in FIG. 5. The test in box 630 begins an iterative loop that precomputes the contexts for each disjunct of a disjunction by calling CREATECHOICECONTEXT for each disjunct in box 632. This ensures that the contexts for all the disjuncts will exist as each is handled by the subsequent steps, which may be necessary for splitting as described below in relation to FIG. 14. The test in box 640 begins a second iterative loop that obtains the context of each disjunct by again calling CREATECHOICECONTEXT, in box 642, and then calls MERGECONTEXTS in box 644 to merge the context of that disjunct with the current context before proceeding to handle the disjunct as shown in FIG. 5.

FIG. 14 shows steps in EXPANDCONTEXTPAIR, a function that is called by UNIFY.CONTEXTS to split a context-value pair into two disjunctive value data units, one with a context-value pair whose context is compatible with a specified context and the other with context-value pairs whose contexts are incompatible with the specified context. The function EXPANDCONTEXTPAIR is therefore called when unifying context-value pairs, to preserve context information that is not applicable to the result of the unification but may be applicable during subsequent operations. EXPANDCONTEXTPAIR only splits a context-value pair when it is being unified with another pair with a different context.

EXPANDCONTEXTPAIR begins in box 650 by receiving a context-value pair and a new context. The step in box 652 obtains the sister contexts of the new context within the old context from the context-value pair by calling the function SISTERCONTEXTS in Appendix B, described below, with the new and old contexts. SISTERCONTEXTS returns the sister contexts in the form of a list of context identifiers.

EXPANDCONTEXTPAIR handles each sister context on the list obtained in box 652 with an iterative loop that begins with the test in box 660. The step in box 662 creates a context-value pair with the same value as that of the context-value pair received in box 650. The context of this new context-value pair is obtained by calling MERGECONTEXTS with the current sister context and with the context of the pair received in box 650. Each new context-value pair is inserted into the data structure after the context-value pair received in box 650, in the step in box 664, so that the last sister context corresponds to the first context-value pair following the one received in box 650.

When all the sister contexts have been handled in this manner, the step in box 666 calls MERGECONTEXTS to merge the new context with the context of the pair received in box 650, and the merged context replaces the context of the pair, in box 668. Then, EXPANDCONTEXTPAIR returns the pair as its result, in box 670.

FIG. 15 shows in greater detail how SISTERCONTEXTS obtains a list of sister contexts. The step in box 700' receives a new context and an old context. SISTERCONTEXTS operates to provide a set of sister contexts that do not intersect with the new context and that together cover all parts of the old context that are not within the new context. As implemented in Appendix B, SISTERCONTEXTS can handle context identifiers that are disjunctions of simpler context identifiers, the simpler context identifiers being conjunctions of choices.

The test in box 702 determines whether the new context is a disjunction. If so, the iterative loop that begins with the test in box 704 handles each of its disjuncts. The step in box 706 makes a recursive call to SISTERCONTEXTS with the next disjunct as the new context and with the old context received in box 700. The sister contexts obtained from the recursive call are then combined with the previously obtained sister contexts by taking the cross product, in box 708. When all the disjuncts have been handled in this manner, the cross product of all the sisters is returned as the list of sister contexts in box 710.

The test in box 720 determines whether the old context is a disjunction. If so, the iterative loop that begins with the test in box 722 handles each of its disjuncts. The step in box 724 calls MERGECONTEXTS with the next disjunct and the new context received in box 700. If the disjunct and the new context are compatible, the merged context is provided as the new context and the disjunct is provided as the old context in an iterative call to SISTERCONTEXTS, in box 726, to obtain the sisters of the merged context. If the result of the call to MERGECONTEXTS in box 724 is NIL, then the disjunct is taken as the sister, because there is no intersection between the disjunct and the new context. In either case, the sisters obtained in box 726 are added to a list of sisters that is returned in box 730 when all the disjuncts have been handled.

If neither of the contexts received in box 700 is a disjunction, the test in box 732 begins an iterative loop that handled all the choices in the new context. The test in box 734 determines whether the next choice in the new context is equal to the next choice in the old context. If so, both choices are popped from the contexts because there would be no sisters based on that choice. But if the next choice in the new context is not in the old context, the step in box 738 obtains the next choice's sisters, not through a recursive call but by going directly to the LFGCONTEXTTREE to retrieve them. The step in box 740 then merges each sister with a merged old context previously obtained by merging the old context received in box 700 with all the previously handled new choices, and collects the merged sisters into a list. Then, the step in box 742 merges the new choice currently being handled with the previously merged old context before returning to the test in box 732. When all the choices in the new context have been handled, the resulting list of sisters is returned in box 730.

The functions described above can be used to include context identifiers in a data structure. We turn now to techniques for combining context-value pairs in a disjunction to facilitate unification.

d. Reducing Disjunctions

As discussed above in relation to FIGS. 1, 6A, and 6B, data structures that include context identifiers are most efficiently unified if the context-value pairs in each disjunctive value have been combined to the extent possible without loss of information. Otherwise, unification will result in an inefficient cross product of context identifiers to consider the possible combinations. This process of combining context-value pairs is called "reduction."

Figure 16:
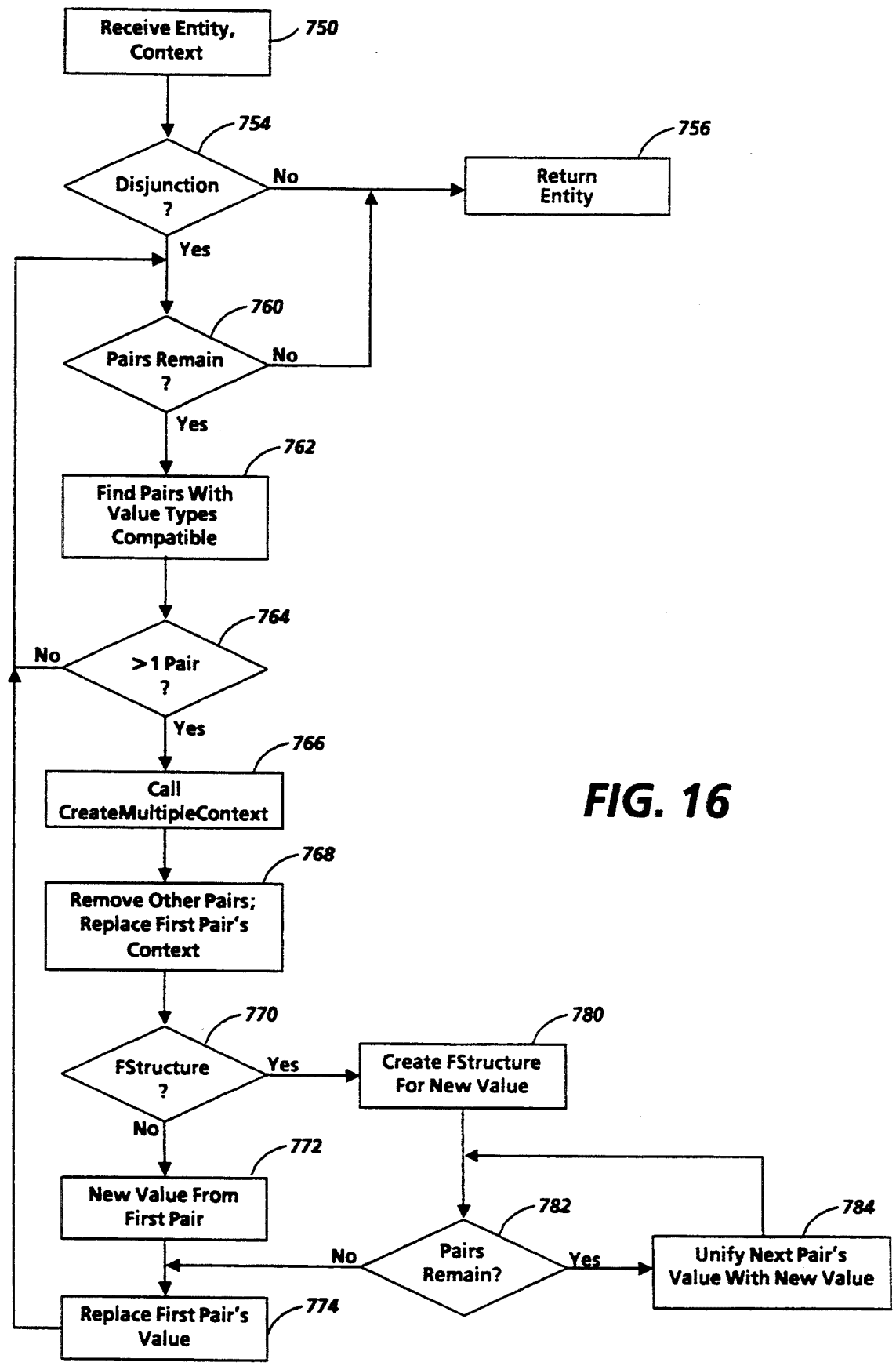
FIG. 16 is a flow chart showing general steps in reducing a disjunctive value data unit by combining context-value pairs, as occurs in FIG. 10A.

FIG. 16 shows general steps in REDUCEDISJUNCTION, a function that is called by UNIFY.CONTEXTS in box 450 in FIG. 10A and that performs reduction on an entity of type Disjunction. REDUCEDISJUNCTION finds context-value pairs within the entity that can be combined without losing information, and merges their contexts and unifies their values to reduce the number of context-value pairs in the disjunction.

REDUCEDISJUNCTION begins by receiving an entity to be reduced and its context, in box 750. The test in box 754 determines whether the entity is of type Disjunction. If not, the entity itself is returned, in box 756, since reduction is not appropriate.

The test in box 760 begins an iterative loop that handles each context-value pair in an entity that is of type Disjunction. The step in box 762 finds all the other context-value pairs in the entity whose values are of types that are type-compatible with the next pair's value. For example, two values are type-compatible with each other if both are value tokens of the same value or if both are entities of type Fstructure, meaning that they can be unified without losing information.- No information is lost in unifying f-structures because the presence of context identifiers preserves all information about the values of the features. If the test in box 764 determines that there are other pairs with values that are type-compatible, the step in box 766 calls the procedure CREATEMULTIPLECONTEXT to create a shared context for the group of compatible pairs. All the compatible pairs except the first are taken out of the entity in box 768, and the context of the first pair is replaced by the shared context obtained from CREATEMULTIPLECONTEXT. The test in box 770 then determines whether the value of the first pair is an entity of type Fstructure. If not, the value from the first pair is taken as the new value, in box 772, and the step in box 774 replaces the value of the first pair with the new value, before returning to the test in box 760.

If the value of the first pair is an entity of type Fstructure, it is necessary to "unify the values. The step in box 780 creates a blank entity of type Fstructure to serve as the new value. Then, the test in box 782 begins an inner iterative loop in which the step in box 784 calls UNIFY with the new value and the value of the next one of the compatible context-value pairs, following the approach discussed above in relation to FIG. 2B. When all the values have been unified, the value of the first pair is replaced with the unified new value, in box 774, before returning to the test in box 760.

When all the context-value pairs have been handled in this manner, the entity itself is returned, in box 756. The returned entity may have fewer context-value pairs than when the entity was received in box 750.

One result of reduction is that, at the conclusion of unification, it is necessary to read out the combinations of disjunctions that are not inconsistent, discussed in detail below. The time required for this read out tends to be proportional to the number of combinations of disjunctions that are not inconsistent. In linguistics, there are ordinarily only one or two such combinations to be read out, so that this additional operation is not burdensome.

We turn next to the handling of pointers when entities of type Disjunction are unified.

e. Pointers

A disjunctive system, in addition to feature-value equations in which the value is a constant, can include equations in which the value is a variable or equations between variables. If such an equation occurs within a disjunct, it is called a conditional equality because it only holds in that disjunct, and not in other disjuncts. Care must be taken in handling conditional equalities to ensure that the truth value of the system is preserved through unification.

Some aspects of handling conditional equalities have been discussed above in relation to unification in a context. As described in relation to UNIFY.CONTEXTS in FIGS. 10A and 10B, unification in a context only unifies those entities with contexts that are compatible with the context of unification. Furthermore, where unification in a context would otherwise result in a splitting and reduction, it is preferable to follow the alternative of creating a disjunctive value, as demonstrated in FIG. 9. Another aspect of handling conditional equalities relates to pointers that are used to represent them.

Figure 17:
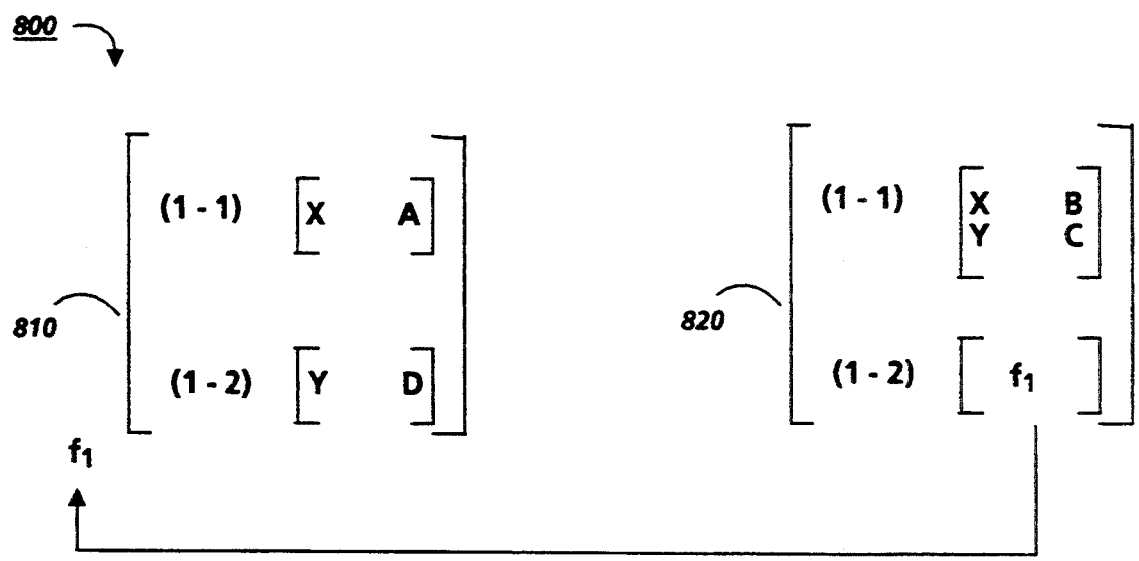
FIG. 17 is a schematic representation showing unified f-structures with a pointer leading initially to a disjunctive value.

FIG. 17 shows graphically how pointers representing conditional equalities can be included in a data structure. The key step is that a pointer resulting from conditional equality is initially set up to lead to a disjunctive value data unit. Data structure 800 in FIG. 17 corresponds to the result of the steps in boxes 440, 442, and 444 in FIG. 10, as a result of which a pointer from one of the values in D2 points at D1, a disjunctive value data unit, rather than at some other entity; in addition, the value from D2 is unified with that from D1 and the unified value is inserted in D1. These steps occur in solving a disjunctive system that includes a conditional equality because the conditional equality results in a call to UNIFY, in box 104 in FIG. 5, and if one of the entities to be unified is of type Disjunction, i.e. a disjunctive value data unit, UNIFY calls UNIFY.CONTEXTS, the function shown in FIGS. 10A and 10B. The step in box 440 ultimately provides a pointer leading to an entity of type Disjunction. The entity to which the pointer leads could subsequently be reduced by REDUCEDISJUNCTION to an entity of type Fstructure, but the pointer continues to point to the same entity, whether or not it is reduced.

Data structure 800 in FIG. 17 includes two disjunctive values 810 and 820, together corresponding to the following disjunctive system:

$$[(f_1 X) = A \wedge (f_2 X) = B \wedge (f_2 Y) = C] \vee [(f_2 Y) = D \wedge f_2 = f_1] \quad (2)$$

In FIG. 17, disjunctive value 810 corresponds to function $f_1$, while disjunctive value 820 corresponds to function $f_2$. Each disjunctive value includes two context-value pairs. The context identifier 1-1 corresponds to the first disjunct of disjunctive system (2) and the context identifier 1-2 corresponds to the second disjunct. As a result of the equality between $f_2$ and $f_1$ in the second disjunct, a pointer leading to the disjunctive value of $f_1$ has been inserted originating in the value paired with the 1-2 context in $f_2$. Then, unification in the 1-2 context has been performed, so that the NIL value of $f_1$ in the 1-2 context has been unified with the feature-value pair that is the value of $f_2$ in the 1-2 context, and the unified value has been inserted in the 1-2 context off$_1$.

In a subsequent step, in box 450 in FIG. 10A, REDUCEDISJUNCTION is called. In the case of data structure 800, it would be called with disjunctive value 810, the disjunctive value data unit that is the result of unification. As a result, the context-value pairs in disjunctive value 810 would be combined, since the values of both are of type Fstructure. The result would be two feature-value pairs, one for the feature X and the other for the feature Y, each with a respective disjunctive value data unit. Therefore, disjunctive value 810 could be reduced from an entity of type Disjunction to an entity of type Fstructure and is therefore equivalent to such an entity. The pointer would not be repositioned or divided into two pointers, one to each of the disjunctive value data units, but would continue to lead to disjunctive value 810. During subsequent operations that follow the pointer, the information about which context identifier to follow could be determined from the source of the pointer, making it unnecessary for the pointer to lead to that context identifier.

Pointers that lead initially to disjunctive value data units thus avoid difficulties that would result if the pointers led instead to other entities such as context identifiers or values. The source of the pointer provides an applicable context identifier, which can then be used to identify the relevant context-value pair in any disjunctive value data unit to which the pointer eventually leads. This ensures that references are not made to values, so that disjunctive values can be freely unified with other disjunctive values or can be reduced without destroying a reference to an internal value.

2. Extracting Solutions

When unification is complete, SOLVE calls GOODCONTEXTS to return a list of fully qualified contexts that have no inconsistencies. A fully qualified context is a context that has one choice from each disjunction; GOODCONTEXTS therefore returns NIL if all the choices of any of the disjunctions are inconsistent. SOLVE then calls EXTRACTSOLUTION to obtain f-structures corresponding to each fully qualified context, and collects these f-structures into a list of solutions that is returned. Each f-structure includes a set of feature-value pairs that are consistent.

GOODCONTEXTS operates on the fully unified data structure, including context identifiers. It walks through the data structure, finding consistent choices and taking the cross product of each of them with its previous result to build up the list of fully qualified contexts. In effect, this eliminates inconsistent contexts and expands consistent contexts to obtain all consistent fully qualified contexts. In the example shown in box 40 in FIG. 1, for example, GOODCONTEXTS would find from the disjunctive value of feature "X" that contexts "$c_{14}$" and "$c_{24}$" are consistent, and would pick up the value of feature "Y" in context "$c_4$" and the values of feature "Z" in contexts "$c_1$" and "$c_2$." As explained below, a NIL value is not retained, however, so that feature "Z" would not appear in the solution for context "$c_{24}c$," as shown in box 50 in FIG. 1.

If the invention were implemented with ATMS, the function performed by GOODCONTEXTS might be instead done by determining the fully qualified contexts from the inconsistent contexts. It would also be possible to present the fully unified data structure to a user for visual extraction of solutions.

Each fully qualified context can be used by EXTRACTSOLUTIONS to obtain the corresponding f-structure, as shown in box 50 in FIG. 1. EXTRACTSOLUTION similarly walks through the unified data structure. Whenever it encounters a disjunctive value, it takes the value paired with the context that corresponds to the fully qualified context it is handling. It associates that value with the feature with which the disjunctive value is associated to form a feature-value pair for the f-structure. But if the value is NIL, EXTRACTSOLUTIONS does not add a feature-value pair, because the NIL value is a special value that means that the feature has no value. In the implementation of Appendices A, B, and C, each feature should have at most one non-NIL atomic value in each context, since the contexts are genuine alternatives. If overlapping context were permitted, and more than one value were obtained for a feature, the values could be unified.

In effect, EXTRACTSOLUTIONS does the reverse of REDUCEDISJUNCTION, pulling the context identifiers upward in the data structure, and leaving only the feature-value pairs.

C. Miscellaneous

The invention has been implemented with the LFG system and tested on a wide range of grammars. On complex grammars in LFG, the invention yields performance improvements up to a factor of 4 in general and exponential improvements in some special cases. Use of ATMS, as pointed out above, could result in further performance improvement. Furthermore, the usefulness of the invention is not limited to natural language grammar. The invention may also be useful in database compaction, machine vision, speech recognition, or any other application in which greater resolution of data is sought.

Although the invention does not solve the NP-complete problem, it does avoid exponential growth for typical examples of the problem that are decomposible into independent P class problems. For example, in a long sentence, different disjunctions are typically independent if far apart, so that use of the disjunctive normal form is unnecessary and the disjunctions can be treated independently as P class problems. In cases where disjunctions are not independent, the use of context identifiers keeps track of their relationships and allows the consideration of combinations of disjuncts from different disjunctions as necessary without solving the NP-complete problem. Since any NP-complete problem can be converted into any other, the invention should be useful with other problems in which disjunctions occur that can be treated as independent P class problems.

The implementation of Appendices A, B, and C could be extended and modified in a variety of ways. For example, it could be extended to handle equations other than disjunctions and equalities, such as sets or constraints. In addition, various modifications could be made in the handling of context identifiers.

One modification that could be implemented would be to modify UNIFY.CONTEXTS, shown in FIGS. 10A and 10B, so that pointers would be inserted before beginning the iterative loop beginning with box 430, rather than in box 440. In other words, instead of splitting each of a number of contexts and including a pointer in the value of one of the splits for each context, the pointer could be included in a single additional context-value pair.

Another modification in UNIFY.CONTEXTS would be to unify pointers before finding the pairs of contexts. In other words, if one of the entities being unified is a pointer, the entity to which the pointer leads could be immediately unified in the context of the pointer rather than searching to find the appropriate context-value pair for unification.

Yet another modification would be to change all the entities into f-structures, so that every value in an entity of type Disjunction would be an entity of type Fstructure. This could be done, for example, by adding a special feature called "type" that could take any of the values that are not f-structures. For example, the value "A" would become the feature-value pair [type A]. This would make it possible for REDUCEDISJUNCTION to combine more context-value pairs together.

FIGS. 6A and 6B indicate that the result of reducing a disjunctive value can be an f-structure. As implemented by REDUCEDISJUNCTION, however, the result of reducing a disjunctive value will be another disjunctive value in which the NULL context is paired with the f-structure, which is equivalent to an f-structure without a context as shown in the figures even though it contains the additional NULL context. In general, the implementation of Appendices A, B, and C maintains data structures that have context identifiers and values on alternate levels, so that the implementation preserves some surplus NULL contexts that could otherwise be eliminated.

The invention has been disclosed in relation to f-structures and disjunctive values, which are particularly appropriate to unification in a system such as LFG. As discussed above, however, the invention could also be applied to other types of unification. For example, the invention could be applied to term unification in which the associations between features and values shown in FIG. 1 are based on the positions of the values, each position in an array of values corresponding to a respective feature. In this case, each position in such an array of values could include a context identifier. If a position has different values in different arrays, the context identifiers in those positions could identify the contexts in which the respective values hold. Unification on two such arrays could then be performed based on the context identifiers of the values in corresponding positions.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

10/999

What is claimed:

1. A system for solving a logical formula using unification, the logical formula including a plurality of terms; at least one of the terms including a disjunction, each disjunction having a plurality of disjuncts, each disjunct having a respective context; the system comprising:
   a first data unit and a second data unit, the first data unit including data relating to a first one of the terms of the logical formula and the second data unit including data relating to a second one of the terms of the logical formula;
   a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; and
   a processor for performing unification, the processor including:
      first means for accessing the first data unit and the second data unit and the first and second context identifiers; and
      second means for using the first and second context identifiers to determine whether to unify the first and second data units.

2. The system of claim 1 in which the first term of the logical formula includes a first value and the second term of the logical formula includes a second value, the first data unit including a first value token indicating the first value and the second data unit including a second value token indicating the second value.

3. The system of claim 2 in which each of the first and second terms of the logical formula includes a feature that can take either of the first and second values; the processor further comprising third means for producing a third data unit as a result of unifying the first and second data units, the third data unit including a feature token indicating the feature.

4. The system of claim 1 in which the first context is one of a first set of genuine alternatives and the second context is one of a second set of genuine alternatives, the second means determining to unify the first and second data units based on the first and second context identifiers.

5. The system of claim 1 in which the first context identifier includes a first number identifying a set of genuine alternatives that includes the first context and a second number identifying the first context.

6. The system of claim 1 in which the first term is a disjunct that includes a value, the first data unit including the first context identifier and a value token indicating the value.

7. The system of claim 6 in which the disjunct further includes a feature that can take the value, the first data unit including a feature token indicating the feature.

8. The system of claim 1 in which the first data unit includes the first context identifier.

9. The system of claim 1 in which the first context is a null context that includes the respective contexts of all of the disjuncts of the logical formula.

10. The system of claim 1 in which the processor further comprises third means for unifying the first and second data units to produce a unified data unit if the second means determines to unify the first and second data units.

11. The system of claim 10 in which the third means is further for unifying the first and second context identifiers to produce a unified context identifier indicating a third context that includes the intersection of the first and second contexts, the third means unifying the first and second context identifiers if the second means determines to unify the first and second data units.

12. The system of claim 10 in which the processor further comprises fourth means for using the unified data unit to obtain a solution of the logical formula.

13. The system of claim 1 in which the processor further comprises third means for producing the first and second data units and the first and second context identifiers from the logical formula.

14. The system of claim 13 in which the third means produces the first data unit so that the first data unit includes the first context identifier.

15. A method of solving a logical formula using unification, the logical formula including a plurality of terms; at least one of the terms including a disjunction, each disjunction having a plurality of disjuncts, each disjunct having a respective context; the method being performed with a system that includes:

a first data unit and a second data unit, the first data unit including data relating to a first one of the terms of the logical formula and the second data unit including data relating to a second one of the terms of the logical formula;

a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; and a processor for accessing the first and second data units and the first and second context identifiers and for performing unification;

the method comprising steps of:
accessing the first data unit and the second data unit and the first and second context identifiers; and using the first and second context identifiers to determine whether to unify the first and second data units.

16. The method of claim 15 in which the second context is different than the first context, the step of using the first and second context identifiers further comprising a substep of determining whether the first and second contexts are genuine alternatives based on the first and second context identifiers.

17. The method of claim 16 in which the first and second contexts are members of a set of genuine alternatives, the first context identifier including a first number identifying the set of genuine alternatives and a second number identifying the first context, the second context identifier including the first number and a third number identifying the second context; the substep of determining whether the first and second contexts are genuine alternatives comprising a substep of determining that they are genuine alternatives based on the first, second, and third numbers.

18. The method of claim 16 further comprising, if the first and second contexts are not genuine alternatives, a step of unifying the first and second data units to obtain a unified data unit; the step of using the first and second context identifiers determining not to unify the first and second data units if the first and second contexts are genuine alternatives.

19. The method of claim 18 in which each of the first and second data units includes a respective value token corresponding to a respective value; the step of unifying the first and second data units comprising a substep of determining whether the first and second data units are consistent based on whether their respective value tokens are consistent.

20. The method of claim 15 in which each of the first and second data units includes a respective value token corresponding to a respective value; the method further comprising, if the step of using the first and second context identifiers determines to unify the first and second data units, a step of unifying the first and second data units; the step of unifying the first and second data units comprising a substep of determining whether the first and second data units are consistent based on whether their respective value tokens are consistent.

21. The method of claim 15 in which the first and second data units include first and second value data units, respectively, the first and second value data units including first and second feature-value pairs, respectively; the second feature-value pair including a feature token and a value token; the method further comprising, if the step of using the first and second context identifiers determines to unify the first and second data units, a step of unifying the first and second data units; the step of unifying the first and second data units comprising unifying the value token with an indeterminate disjunctive value data unit to obtain a unified disjunctive value data unit and then including [the]a third feature-value pair including the feature token and the unified disjunctive value data unit in the first value data unit.

22. The method of claim 15 in which the method further comprises, if the step of using the first and second context identifiers determines to unify the first and second data units, a step of unifying the first and second data units; the unifying step comprising a substep of performing propositional reasoning with the first and second context identifiers.

23. The method of claim 15 in which the system further includes a third context identifier that indicates a third context in which to unify the first and second data units; the step of using the first and second context identifiers further comprising a substep of using the third context identifier in determining whether to unify the first and second data units.

24. The method of claim 23 in which the substep of using the third context identifier comprises a substep of determining whether the third context intersects with each of the first and second contexts based on the first, second, and third context identifiers.

25. The method of claim 23 in which the first data unit includes the first context identifier, the method further comprising, if the step of using the first and second context identifiers determines to unify the first and second data units, a step of unifying the first and second data units; the unifying step comprising a substep of positioning a pointer to the first data unit in the second data unit.

26. The method of claim 15 in which the method further comprises, if the step of using the first and second context identifiers determines to unify the first and second data units, a step of unifying the first and second data units; the unifying step comprising a substep of unifying the first and second data units to obtain a unified data unit.

27. The method of claim 15 in which the method further comprises, if the step of using the first and second context identifiers determines to unify the first and second data units, a step of unifying the first and second data units.

28. The method of claim 27 in which the method further comprises, if the step of using the first and second context identifiers determines to unify the first and second data units, a step of merging the first and second context identifiers, the unifying step producing a unified data unit and the merging step producing a merged context identifier identifying a merged context.

29. The method of claim 28 in which the first data unit includes a first feature token and a first value token, the unifying step comprising a substep of producing the unified data unit so that it includes the first feature token and a subunit, the subunit including the first context identifier and the first value token.

30. The method of claim 29 in which the second data unit includes a second feature token equal to the first feature token and a second value token different than the first value token, the unifying step further comprising a substep of producing the unified data unit so that the subunit includes the second context identifier and the second value token.

31. The method of claim 30 in which the merged context is a null context that includes the respective contexts of all of the disjuncts of the logical formula, the method further comprising a step of eliminating the merged context identifier.

32. The method of claim 27 in which the method further comprises, if the step of using the first and second context identifiers determines to unify the first and second data units, a step of using the first and second context identifiers to produce a third context identifier.

33. The method of claim 32 in which the first context identifier indicates that the first context is a null context that includes the respective contexts of all the disjuncts of the logical formula, the step of using the first and second context identifiers comprising choosing the second context identifier as the third context identifier.

34. The method of claim 32 in which the first and second context identifiers indicate that the first and second contexts are equal, the step of using the first and second context identifiers comprising choosing the first context identifier as the third context identifier.

35. The method of claim 32 in which the step of using the first and second context identifiers comprises a substep of finding an intersection of the first and second contexts, the third context identifier identifying the intersection of the first and second contexts.

36. The method of claim 27 in which the first and second data units include first and second feature-value pairs, respectively; the first feature-value pair including a first feature token indicating a first feature and a first value data unit indicating a first value; the second feature-value pair including a second feature token indicating a second feature and a second value data unit indicating a second value; the first feature and the second feature being different features; the step of unifying the first and second data units comprising a substep of adding the second feature value pair to the first data unit.

37. The method of claim 27 in which the first and second data units include first and second feature-value pairs, respectively; the first feature-value pair including a first feature token indicating a first feature and a first value data unit indicating a first value; the second feature-value pair including a second feature token indicating the first feature and a second value data unit indicating a second value; the step of unifying the first and second data units comprising a substep of unifying the first and second value data units.

38. The method of claim 27 in which the step of unifying the first and second data units produces a unified data unit, the method further comprising a step of using the unified data unit to obtain a solution of the logical formula.

39. The method of claim 15 in which the first context is a null context that includes the respective contexts of all the disjuncts of the logical formula.

40. The method of claim 15, further comprising a step of producing the first and second data units and the first and second context identifiers from the logical formula.

41. The method of claim 40 in which the step of producing the first and second data units and the first and second context identifiers comprises a substep of producing the first data unit so that the first data unit includes the first context identifier.

42. A computer system for solving a logical formula using unification, the logical formula including a plurality of terms; at least one of the terms including a disjunction, each disjunction having a plurality of disjuncts, each disjunct having a respective context; the system comprising:
   memory;
   a first data unit and a second data unit stored in the memory, the first data unit including data relating to a first one of the terms of the logical formula and the second data unit including data relating to a second one of the terms of the logical formula;
   a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; the first and second context identifiers being stored in the memory; and a processor for performing unification, the processor being connected for accessing the memory; the processor including:
   first means for accessing the first data unit and the second data unit and the first and second context identifiers in the memory; and
   second means for using the first and second context identifiers to determine whether to unify the first and second data units.

43. A computer-implemented method of solving a logical formula using unification, the logical formula including a plurality of terms; at least one of the terms including a disjunction, each disjunction having a plurality of disjuncts, each disjunct having a respective context; the method being performed with a computer system that includes:

memory;

a first data unit and a second data unit stored in the memory, the first data unit including data relating to a first one of the terms of the logical formula and the second data unit including data relating to a second one of the terms of the logical formula;

a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; the first and second context identifiers being stored in the memory; and a processor connected for accessing the first and second data units and the first and second context identifiers in the memory and for performing unification;

the method comprising steps of:
   accessing the first data unit and the second data unit and the first and second context identifiers in the memory; and
   using the first and second context identifiers to determine whether to unify the first and second data units.

44. A computer system for solving a logical formula that contains linguistic information using unification, the logical formula including a plurality of terms that contain linguistic information; at least one of the terms including a disjunction, each disjunction having a plurality of disjuncts, each disjunct having a respective context; the system comprising:

memory;

a first data unit and a second data unit stored in the memory, the first data unit including data relating to linguistic information in a first one of the terms of the logical formula and the second data unit including data relating to linguistic information in a second one of the terms of the logical formula; a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; the first and second context identifiers being stored in the memory; and a processor for performing unification, the processor being connected for accessing the memory; the processor including:
   first means for accessing the first data unit and the second data unit and the first and second context identifiers in the memory; and
   second means for using the first and second context identifiers to determine whether to unify the first and second data units.

45. A computer-implemented method of solving a logical formula that contains linguistic information using unification, the logical formula including a plurality of terms that contain linguistic information; at least one of the terms including a disjunction, each disjunction having a plurality of disjuncts, each disjunct having a respective context; the method being performed with a computer system that includes:

memory;

a first data unit and a second data unit stored in the memory, the first data unit including data relating to linguistic information in a first one of the terms of the logical formula and the second data unit including data relating to linguistic information in a second one of the terms of the logical formula;

a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; the first and second context identifiers being stored in the memory; and a processor connected for accessing the first and second data units and the first and second context identifiers in the memory and for performing unification;

the method comprising steps of:
   accessing the first data unit and the second data unit and the first and second context identifiers in the memory; and
   using the first and second context identifiers to determine whether to unify the first and second data units.

46. A computer system for solving a logical formula that contains linguistic information using unification, the logical formula including a plurality of terms that contain linguistic information; at least one of the terms including a disjunction, each disjunction having a plurality of disjuncts, each disjunct having a respective context; the system comprising:

memory;

a first data unit and a second data unit stored in the memory, the first data unit including data relating to linguistic information in a first one of the terms of the logical formula and the second data unit including data relating to linguistic information in a second one of the terms of the logical formula;

a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; the first and second context identifiers being stored in the memory;

unification instruction data stored in the memory; the unification instruction data indicating first unification instructions and second unification instructions; and a processor connected for accessing the memory; the processor accessing the unification instruction data and executing the first unification instructions and the second unification instructions to perform unification of the first and second data units;

the processor, in executing the first unification instructions, accessing the first data unit and the second data unit and the first and second context identifiers in the memory;

the processor, in executing the second unification instructions, using the first and second context identifiers to determine whether to unify the first and second data units.

47. A computer-implemented method of solving a logical formula that contains linguistic information using unification, the logical formula including a plurality of terms that contain linguistic information; at least one of the terms including a disjunction, each disjunction having a plurality of disjuncts, each disjunct having a respective context; the method being performed with a computer system that includes:

memory;

a first data unit and a second data unit stored in the memory, the first data unit including data relating to linguistic information in a first one of the terms of the logical formula and the second data unit including data relating to linguistic information in a second one of the terms of the logical formula;

a first context identifier identifying a first context that includes the respective context of each of a first set of one or more disjuncts of the logical formula; a second context identifier identifying a second context that includes the respective context of each of a second set of one or more disjuncts of the logical formula; the first context applying to the first data unit and the second context applying to the second data unit; the first and second context identifiers being stored in the memory;

unification instruction data stored in the memory; the unification instruction data indicating first unification instructions and second unification instructions; and a processor connected for accessing the memory; the processor executing the first unification instructions and the second unification instructions to perform unification of the first and second data units;

the method comprising:

operating the processor to access the unification instruction data and execute the first unification instructions; the processor, in executing the first unification instructions, accessing the first data unit and the second data unit and the first and second context identifiers in the memory; and operating the processor to access the unification instruction data and execute the second unification instructions; the processor, in executing the second unification instructions, using the first and second context identifiers to determine whether to unify the first and second data units.

48. A computer system for solving a logical formula that contains linguistic information using unification, the logical formula including a plurality of terms that contain linguistic information; at least one of the terms including a disjunction, each disjunction having a plurality of disjuncts, each disjunct having a respective context; the system comprising:

memory;

formula data stored in memory; the formula data defining the logical formula;

unification instruction data stored in the memory; the unification instruction data indicating first unification instructions and second unification instructions; and a processor connected for accessing the memory; the processor accessing the formula data and the unification instruction data and executing the first unification instructions and the second unification instructions to perform unification;

the processor, in executing the first unification instructions, accessing the formula data in the memory and using the formula data to produce first and second data units and first and second context identifiers and storing the first and second data units and the first and second context identifiers in the memory; the first data unit including the first context identifier and the second data unit including the second context identifier;

the first data unit including data relating to linguistic information in a first one of the terms of the logical formula and the second data unit including data relating to linguistic information in a second one of the terms of the logical formula;

the first context identifier identifying a first context that includes the respective context of each of a first set of one or more disjuncts of the logical formula; the second context identifier identifying a second context that includes the respective context of each of a second set of one or more disjuncts of the logical formula; the first context applying to the first data unit and the second context applying to the second data unit;

the processor, in executing the second unification instructions, accessing the first data unit and the second data unit and the first and second context identifiers in the memory and using the first and second context identifiers to determine whether to unify the first and second data units.

49. A computer-implemented method of solving a logical formula that contains linguistic information using unification, the logical formula including a plurality of terms that contain linguistic information; at least one of the terms including a disjunction, each disjunction having a plurality of disjuncts, each disjunct having a respective context; the method being performed with a computer system that includes:

memory;

formula data stored in memory; the formula data defining the logical formula;

unification instruction data stored in the memory; the unification instruction data indicating first unification instructions and second unification instructions; and a processor connected for accessing the memory; the processor accessing the formula data and the unification instruction data and executing the first unification instructions and the second unification instructions to perform unification;

the method comprising:

operating the processor to access the unification instruction data and execute the first unification instructions; the processor, in executing the first unification instructions, accessing the formula data in the memory and using the formula data to produce first and second data units and first and second context identifiers and storing the first and second data units and the first and second context identifiers in the memory; the first data unit including the first context identifier and the second data unit including the second context identifier;

the first data unit including data relating to linguistic information in a first one of the terms of the logical formula and the second data unit including data relating to linguistic information in a second one of the terms of the logical formula;

the first context identifier identifying a first context that includes the respective context of each of a first set of one or more disjuncts of the logical formula; the second context identifier identifying a second context that includes the respective context of each of a second set of one or more disjuncts of the logical formula; the first context applying to the first data unit and the second context applying to the second data unit;

operating the processor to access the unification instruction data and execute the second unification instructions; the processor, in executing the second unification instructions, accessing the first data unit and the second data unit and the first and second context identifiers in the memory and using the first and second context identifiers to determine whether to unify the first and second data units.

50. A computer system for solving a logical formula that contains linguistic information using unification, the logical formula including a plurality of terms that contain linguistic information; at least one of the terms including a disjunction, each disjunction having a plurality of disjuncts, each disjunct having a respective context; the system comprising:

memory;

formula data stored in memory; the formula data defining the logical formula;

unification instruction data stored in the memory; the unification instruction data indicating first unification instructions, second unification instructions, third unification instructions, and fourth unification instructions; and a processor connected for accessing the memory; the processor accessing the formula data and the unification instruction data and executing the first unification instructions, the second unification instructions, the third unification instructions, and the fourth unification instructions to solve the logical formula;

the processor, in executing the first unification instructions, accessing the formula data in the memory and using the formula data to produce first and second data units and first and second context identifiers and storing the first and second data units and the first and second context identifiers in the memory; the first data unit including the first context identifier and the second data unit including the second context identifier;

the first data unit including data relating to linguistic information in a first one of the terms of the logical formula and the second data unit including data relating to linguistic information in a second one of the terms of the logical formula;

the first context identifier identifying a first context that includes the respective context of each of a first set of one or more disjuncts of the logical formula; the second context identifier identifying a second context that includes the respective context of each of a second set of one or more disjuncts of the logical formula, the first context applying to the first data unit and the second context applying to the second data unit;

the processor, in executing the second unification instructions, accessing the first data unit and the second data unit and the first and second context identifiers in the memory and using the first and second context identifiers to determine whether to execute the third unification instructions and the fourth unification instructions;

the processor, in executing the third unification instructions, unifying the first and second data units to obtain a unified data unit and storing the unified data unit in the memory;

the processor, in executing the fourth unification instructions, accessing the unified data unit in the memory and using the unified data unit to obtain solution data indicating a solution of the logical formula, the solution data including linguistic information about the logical formula.

51. A computer-implemented method of solving a logical formula that contains linguistic information using unification, the logical formula including a plurality of terms that contain linguistic information; at least one of the terms including a disjunction, each disjunction having a plurality of disjuncts, each disjunct having a respective context; the method being performed with a computer system that includes:

memory;

formula data stored in memory; the formula data defining the logical formula;

unification instruction data stored in the memory; the unification instruction data indicating first unification instructions, second unification instructions, third unification instructions, and fourth unification instructions; and a processor connected for accessing the memory; the processor accessing the formula data and the unification instruction data and executing the first unification instructions, the second unification instructions, the third unification instructions, and the fourth unification instructions to solve the logical formula;

the method comprising:

operating the processor to access the unification instruction data and execute the first unification instructions; the processor, in executing the first unification instructions, accessing the formula data in the memory and using the formula data to produce first and second data units and first and second context identifiers and storing the first and second data units and the first and second context identifiers in the memory; the first data unit including the first context identifier and the second data unit including the second context identifier;

the first data unit including data relating to linguistic information in a first one of the terms of the logical formula and the second data unit including data relating to linguistic information in a second one of the terms of the logical formula;

the first context identifier identifying a first context that includes the respective context of each of a first set of one or more disjuncts of the logical formula; the second context identifier identifying a second context that includes the respective context of each of a second set of one or more disjuncts of the logical formula; the first context applying to the first data unit and the second context applying to the second data unit;

operating the processor to access the unification instruction data and execute the second unification instructions; the processor, in executing the second unification instructions, accessing the first data unit and the second data unit and the first and second context identifiers in the memory and using the first and second context identifiers to determine whether to execute the third unification instructions and the fourth unification instructions;

operating the processor to access the unification instruction data and execute the third unification instructions; the processor, in executing the third unification instructions, unifying the first and second data units to obtain a unified data unit and storing the unified data unit in the memory;

operating the processor to access the unification instruction data and execute the fourth unification instructions; the processor, in executing the fourth unification instructions, accessing the unified data unit in the memory and using the unified data unit to obtain solution data indicating a solution of the logical formula, the solution data including linguistic information about the logical formula.

* * * * *